US010729997B2

(12) United States Patent
Tucker et al.

(10) Patent No.: US 10,729,997 B2
(45) Date of Patent: *Aug. 4, 2020

(54) SPIN-ON FILTER WITH EXTERNAL THREADS AND METHODS

(71) Applicant: DONALDSON COMPANY, INC., Minneapolis, MN (US)

(72) Inventors: Brian Tucker, Farmington, MN (US); Bradley S. Honermann, Prior Lake, MN (US); Gary H. Gift, Richfield, MN (US); Brent A. Gulsvig, Faribault, MN (US); Kent Mehlhop, Arlington, MN (US); John R. Hacker, Minneapolis, MN (US); Mark S. Emery, Minneapolis, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,623

(22) Filed: Mar. 1, 2019

(65) Prior Publication Data
US 2019/0193008 A1    Jun. 27, 2019

Related U.S. Application Data

(60) Continuation of application No. 15/373,209, filed on Dec. 8, 2016, now Pat. No. 10,220,339, which is a
(Continued)

(51) Int. Cl.
*B01D 35/30* (2006.01)
*B01D 29/11* (2006.01)
(Continued)

(52) U.S. Cl.
CPC .............. *B01D 35/30* (2013.01); *B01D 29/11* (2013.01); *B01D 29/111* (2013.01); *B01D 29/21* (2013.01);
(Continued)

(58) Field of Classification Search
CPC ..... B01D 27/08; B01D 35/30; B01D 2201/34; B01D 27/005; B01D 2201/304;
(Continued)

(56) References Cited

U.S. PATENT DOCUMENTS 4,844,270 A   7/1989  Coffman
5,035,797 A   7/1991  Janik
(Continued)

FOREIGN PATENT DOCUMENTS

DE         196 13 847 A1   10/1997
WO    WO 2004/033067 A2    4/2004
(Continued)

OTHER PUBLICATIONS

European Search Report for Application No. 12186708.9 dated Apr. 2, 2013.
(Continued)

*Primary Examiner* — Claire A Norris
(74) *Attorney, Agent, or Firm* — Merchant & Gould P.C.

(57) ABSTRACT

A filter arrangement for threadably securing to a filter head includes a housing having a surrounding wall defining an interior volume, an open mouth providing access to the interior volume and an end opposite of the open mouth. The surrounding wall has an exterior and an interior. A filter media construction is operably held within the interior volume. A sleeve, distinct from the housing, is secured to the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. A first seal member is oriented against the sleeve to create a seal
(Continued)

with a filter head, when the filter arrangement is secured to the filter head. A filter assembly includes a filter arrangement and a filter head. The filter arrangement is removably secured to the filter head by a threaded connection between the sleeve and the filter head. A system includes an engine utilizing a liquid and a filter assembly in fluid communication with the engine to filter the liquid. Methods of making filter arrangements include utilizing structures characterized above.

20 Claims, 31 Drawing Sheets

Related U.S. Application Data division of application No. 12/995,937, filed as application No. PCT/US2009/046139 on Jun. 3, 2009, now Pat. No. 9,555,347.

(60) Provisional application No. 61/058,337, filed on Jun. 3, 2008.

(51) Int. Cl.
*B01D 29/21* (2006.01)
*B01D 35/00* (2006.01)
*B01D 35/153* (2006.01)
*B01D 35/16* (2006.01)
*B01D 29/96* (2006.01)

(52) U.S. Cl.
CPC ......... *B01D 29/96* (2013.01); *B01D 35/005* (2013.01); *B01D 35/153* (2013.01); *B01D 35/16* (2013.01); *B01D 2201/12* (2013.01); *B01D 2201/127* (2013.01); *B01D 2201/16* (2013.01); *B01D 2201/291* (2013.01); *B01D 2201/295* (2013.01); *B01D 2201/34* (2013.01); *B01D 2201/342* (2013.01); *B01D 2201/347* (2013.01); *B01D 2201/4023* (2013.01); *Y10T 29/49879* (2015.01); *Y10T 29/49895* (2015.01)

(58) Field of Classification Search
CPC ...... B01D 2201/305; B01D 2201/4084; B01D 2201/295; B01D 35/306; B01D 2201/306; Y10S 210/17; Y10S 277/918

USPC .................. 210/450, 232, DIG. 17; 277/641
See application file for complete search history.

(56) References Cited

U.S. PATENT DOCUMENTS

| | | | |
|---|---|---|---|
| 5,080,787 A * | 1/1992 | Brown ................. | B01D 27/005 210/232 |
| 5,118,417 A | 6/1992 | Deibel | |
| 5,685,985 A * | 11/1997 | Brown ................... | B01D 29/21 210/450 |
| 5,772,881 A * | 6/1998 | Stockhowe ............ | B01D 27/08 210/440 |
| 5,906,736 A | 5/1999 | Bounnakhom et al. | |
| 5,906,740 A | 5/1999 | Brown et al. | |
| 6,045,693 A | 4/2000 | Miller et al. | |
| 6,146,527 A | 11/2000 | Oelschlaegel | |
| 6,202,859 B1 | 3/2001 | Langsdoif et al. | |
| 6,635,175 B2 | 10/2003 | Stankowski | |
| 7,232,035 B1 | 6/2007 | Crawford et al. | |
| 7,556,155 B2 * | 7/2009 | Harder ................. | B01D 27/005 210/445 |
| 7,882,961 B2 * | 2/2011 | Menez ................... | B01D 29/21 210/455 |
| 9,545,587 B2 | 1/2017 | Tucker et al. | |
| 9,555,347 B2 | 1/2017 | Tucker et al. | |
| 2007/0095744 A1 | 5/2007 | Bagci et al. | |
| 2009/0014381 A1 | 1/2009 | South et al. | |

FOREIGN PATENT DOCUMENTS

| | | |
|---|---|---|
| WO | WO 2006/012031 A1 | 2/2006 |
| WO | WO 2007/059238 A2 | 5/2007 |
| WO | WO 2007/067791 A3 | 6/2007 |
| WO | WO 2007/070083 A1 | 6/2007 |

OTHER PUBLICATIONS

European Search Report for Application No. 13170624.4 dated Oct. 22, 2013.
European Search Report for Application No. 17171813.3 dated Feb. 26, 2018.

* cited by examiner

SPIN-ON FILTER WITH EXTERNAL THREADS AND METHODS

CROSS REFERENCE TO RELATED APPLICATIONS

This application is a continuation of U.S. patent application Ser. No. 15/373,209, filed Dec. 8, 2016, which issued as U.S. Pat. No. 10,220,339 which is a divisional of U.S. patent application Ser. No. 12/995,937, filed Dec. 2, 2010, which issued as U.S. Pat. No. 9,555,347 which is a National Stage Patent Application of PCT International Patent Application No. PCT/US2009/046139, filed 3 Jun. 2009 in the name of Donaldson Company, Inc., a U.S. national corporation, applicant for the designation of all countries except the U.S., and Brian Tucker, Bradley S. Honermann, Gary H. Gift, Brent A. Gulsvig, Kent Mehlhop, John R. Hacker, and Mark S. Emery, all citizens of the U.S., applicants for the designation of the U.S. only, and claims priority to U.S. Provisional patent application Ser. No. 61/058,337, filed Jun. 3, 2008 and which applications are incorporated herein by reference. To the extent appropriate, a claim of priority is made to each of the above disclosed applications.

TECHNICAL FIELD

This disclosure concerns filter arrangements and methods. In particular, this disclosure concerns spin-on filter assemblies for filtering liquids, such as fuel, lubrication fluids, such as oil, and hydraulic fluids.

BACKGROUND

Conventional spin-on filter designs use a thread plate at the interface end of the filter assembly. This thread plate has flow passages to allow flow in and out of the filter assembly. In addition, there is often an attaching feature near the center line of the filter assembly where threads on the thread plate engage threads on the filter head.

An alternate design is what is sometimes referred to as a "big mouth" filter. In such "big mouth" filters, the thread plate is replaced with a threaded ring. The attaching feature is near the outside diameter of the filter assembly. This design reduces the overall amount of material and is structurally stronger than the thread plate design. The big mouth design has the flexibility of using either internal or external threads. Internal threads are typically used on applications that accept either a spin-on or a bowl/cartridge design. The threaded ring mentioned above, uses internal threads.

Using external threads for a spin-on filter presents technical issues because the typical seaming process used with a threaded ring can not be used. Improvements are desirable.

SUMMARY

A filter arrangement for threadably securing to a filter head is provided. The filter arrangement includes a housing having a surrounding wall defining an interior volume, an open mouth providing access to the interior volume and an end opposite of the open mouth. The surrounding wall has an exterior and an interior. A filter media construction is operably held within the interior volume. A sleeve, distinct from the housing, is secured to the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. A first seal member is oriented against the sleeve to create a seal with a filter head, when the filter arrangement is secured to the filter head.

In another aspect, a filter assembly is provided including a filter arrangement, as characterized above, and a filter head. The filter arrangement is removably secured to the filter head by a threaded connection between the sleeve and the filter head.

In another aspect, a system is provided including an engine utilizing a liquid and a filter assembly, as characterized above, in fluid communication with the engine to filter the liquid.

In another aspect, a method of making a filter arrangement includes providing a housing having a surrounding wall defining an interior volume, an open mouth providing access to the interior volume, and an opposite of the open mouth. The surrounding wall has an exterior and an interior. Next, there is a step of orienting a filter media construction within the interior volume. Next, there is a step of orienting a sleeve, distinct from the housing, around the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. Next, there is a step of securing the sleeve to the housing. The method also includes providing a first seal member oriented against the sleeve to create a seal with the filter head, when the filter arrangement is secured to the filter head.

DETAILED DESCRIPTION

In general, a filter arrangement in accordance with principles of this disclosure uses a drawn metal housing, a threaded sleeve and seals. The threaded sleeve is slid over the outer diameter of the housing and is secured, in various techniques, to the housing. There is at least one seal on the filter arrangement to prevent external leaks between the filter arrangement and the filter head. In some implementations, more than one seal member is utilized.

A. Example Constructions

Figure 38:
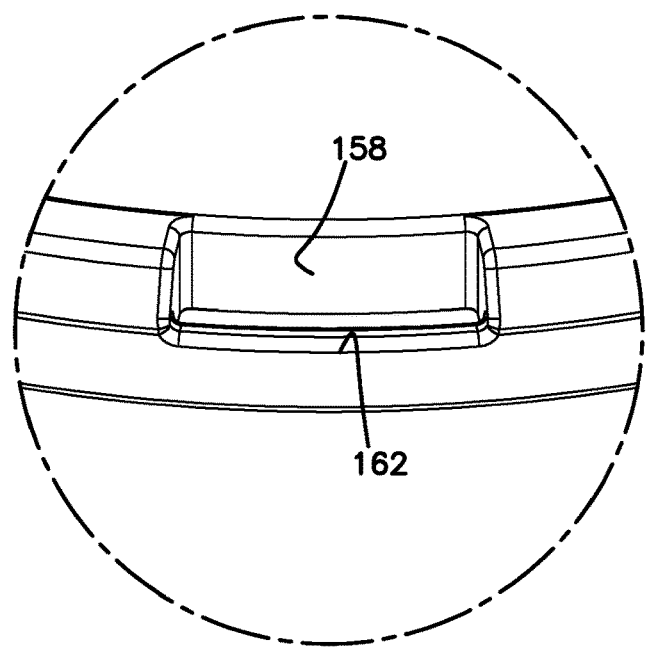
FIG. 38 is an enlarged, perspective view of detail B of FIG. 36.
Figure 39:
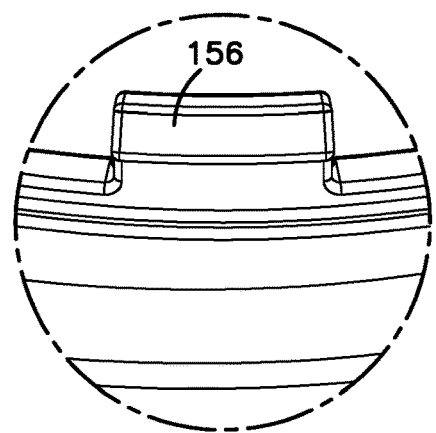
FIG. 39 is an enlarged, perspective view of detail A of FIG. 35.
Figure 40:
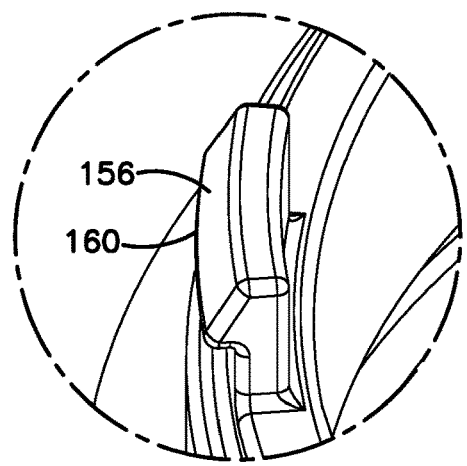
FIG. 40 is an enlarged, perspective view of detail C of FIG. 35.

In general, a filter arrangement is shown at reference numeral 20. The filter arrangement 20 is designed for threadably securing to a filter head 22 (FIG. 38). In general, the filter arrangement 20 is threaded onto the filter head 22 for operable use. When it is time to service the filter arrangement 20, the filter arrangement 20 is removed from the filter head 22 by unscrewing or unthreading the filter arrangement 20 from the head 22. The filter head 20 includes a housing 24. The housing 24 is typically a drawn metal housing having generally a thin-walled construction. The housing 24 includes a surrounding wall 26 defining an interior volume 28.

At one end of the housing 24 is an open mouth 30 providing access to the interior volume 28. Opposite of the open mouth 30 is an end 32. In some embodiments, such as FIGS. 1-11, the end 32 defines an opening 24 adapted to receive other structure such as a drain valve. In other embodiments, such as the embodiment of FIGS. 12-39, the end 32 is a closed end and is not operably openable.

Within the interior volume 28 of the housing 24 is a filter media construction 36 (or filter cartridge 36). The filter media construction 36 may include pleated media 38 arranged in a cylindrical form to define an open filter interior 40. A first end cap 42 is secured to one end of the pleated media 38. In some arrangements, a second end cap 44 is secured to an opposite end of the pleated media 38. The filter media construction 36 may also include an inner filter support or liner 46, extending between end cap 42 and second end cap 44, and lining the open filter interior 40.

In general, liquid to be filtered, flowing in a forward-flow manner, flows from a volume 48 between the wall 26 and the pleated media 38, through the media 38, and into the open filter interior 40. From there, the filtered liquid flows out through an aperture 50 in the first end cap 42. From there the liquid is directed into the filter head 22, where it is then directed to downstream components.

In example embodiments illustrated, the filter media construction 36 further includes a filter element seal member 52 to provide a seal between the unfiltered side and the filtered side of the filter media construction 36. The filter element seal member 52 will be sealed against a corresponding portion on the filter head 22. In the various embodiments shown, the filter element seal member 52 is depicted as a seal ring 54 that is held within a radial groove 56 of an axially extending portion 58 of a first end cap 42.

In some implementations, the filter media construction 36 may further include structure to help with centering the filter media construction within the housing 24. This is described below, in connection with certain embodiments.

In general, the filter arrangement 20 includes a sleeve 60, distinct from the housing 24. By the term "distinct from the housing," it is meant that the sleeve is not made from the same piece of material as the housing 24. While the sleeve 60 can be molded onto the housing 24, it should be understood that the housing 24 exists as a separate piece before the molding process, and therefore, the sleeve 60 is distinct from the housing 24.

The sleeve 60 is secured to an exterior 62 of the surrounding wall 26 and adjacent to the mouth 30. The surrounding wall 26 also has an opposite, interior 64. The sleeve 60 extends partially along the exterior 62 of the surrounding wall 26, generally less than half of the length of the surrounding wall 26. The sleeve 60 has an exterior 66 and an opposite interior 68.

In general, the exterior 66 of the sleeve 60 defines mounting threads 70 constructed and arranged to removably mount with the filter head 22, when the filter arrangement 20 is secured to the filter head 22. The threads 70 can be any type of conventional thread utilized in these types of systems, such as Unified Screw Threads, per ANSI B1.7M-1984. The interior 68 of the sleeve 60 is generally mounted against the exterior 62 of the surrounding wall 26. The sleeve 60 is secured to the housing 24, utilizing various techniques, as described below.

In general, the filter arrangement 20 further includes a first seal member 72 oriented against the sleeve 60 to create a seal with the filter head 22, when the filter arrangement 20 is secured to the filter head 22. The first seal member 72 can be a radially directed seal member 74 held by a groove 76 in the exterior 66 of the sleeve 60 such as depicted in the embodiments of FIGS. 3, 10, 12, 13, 28, and 29; or alternatively, the first seal member 72 can be a face seal member 78 oriented on an axial end 80, such as depicted in the embodiments of FIGS. 18, 19, 24, 25, 26, and 27.

Figure 41:
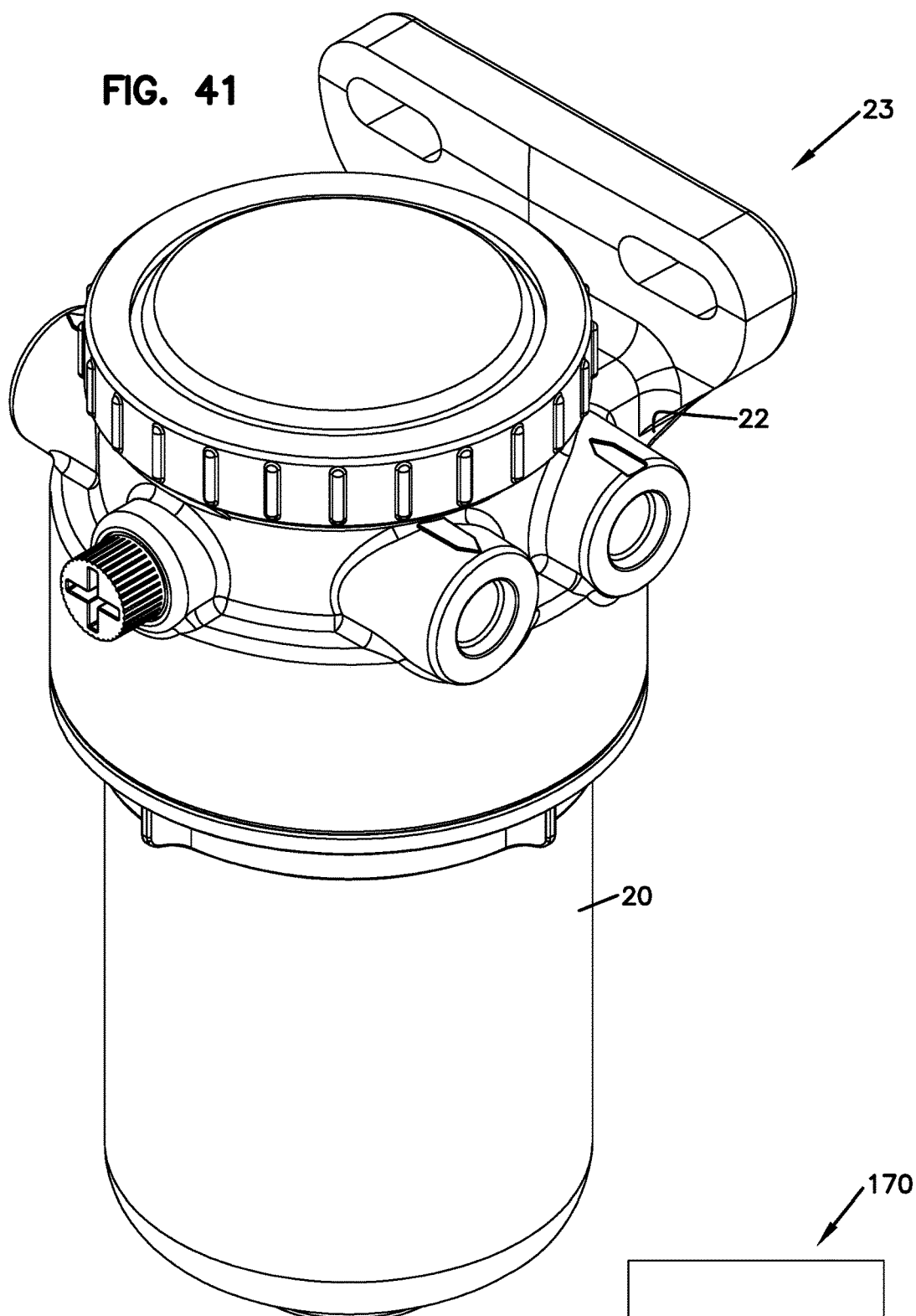
FIG. 41 is a schematic, side-elevational view of a filter assembly, including a filter head and a filter arrangement, constructed in accordance with principles of this disclosure.
Figure 42:
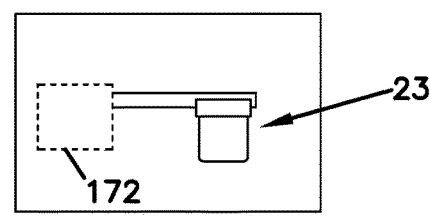
FIG. 42 is a schematic view of a filter system utilizing a filter assembly constructed in accordance with principles of this disclosure.

The filter arrangement 20 can be connected to the filter head 22 to form a filter assembly 23, as shown in FIG. 41. In FIG. 42, a system is shown at 170. The system 170 includes an engine 172 utilizing a liquid. The liquid can be, for example, lubrication, fuel, or a hydraulic fluid. The filter assembly 23 is in fluid communication with the engine 172 to filter the liquid that utilized by the engine 172.

1. The Embodiments of FIGS. 1-11

In the embodiment of FIGS. 1-11, the housing surrounding wall 26 has a plurality of tabs 82 extending radially outwardly from the open mouth 30. In the embodiment shown, the tabs 82 are evenly spaced about the rim 84 of the mouth 30. The tabs 82 are illustrated as being curved to form a hook-shape 86, FIG. 8. The sleeve 60 has a first rim 88. When the sleeve 60 is passed over the wall 26 of the housing 24, it is moved axially along the wall 26 until the first rim 88 engages a radially extending flange 90 at the mouth 30. The sleeve 60 is rotated relative to the housing 24 until slots 92 defined by the sleeve 60 along the first rim 88 line up with the tabs 82.

The tabs 82 are then crimped in a radially direction toward the housing 24 center line to affix the housing 24 and the threaded sleeve 60 together. Crimping the tabs 82 into the slots 92 creates a mechanical lock between the housing 24 and the threaded sleeve 60, which prevents the housing 24 from turning about its center line relative to the sleeve 60 and prevents relative motion in an axial direction.

Figure 5:
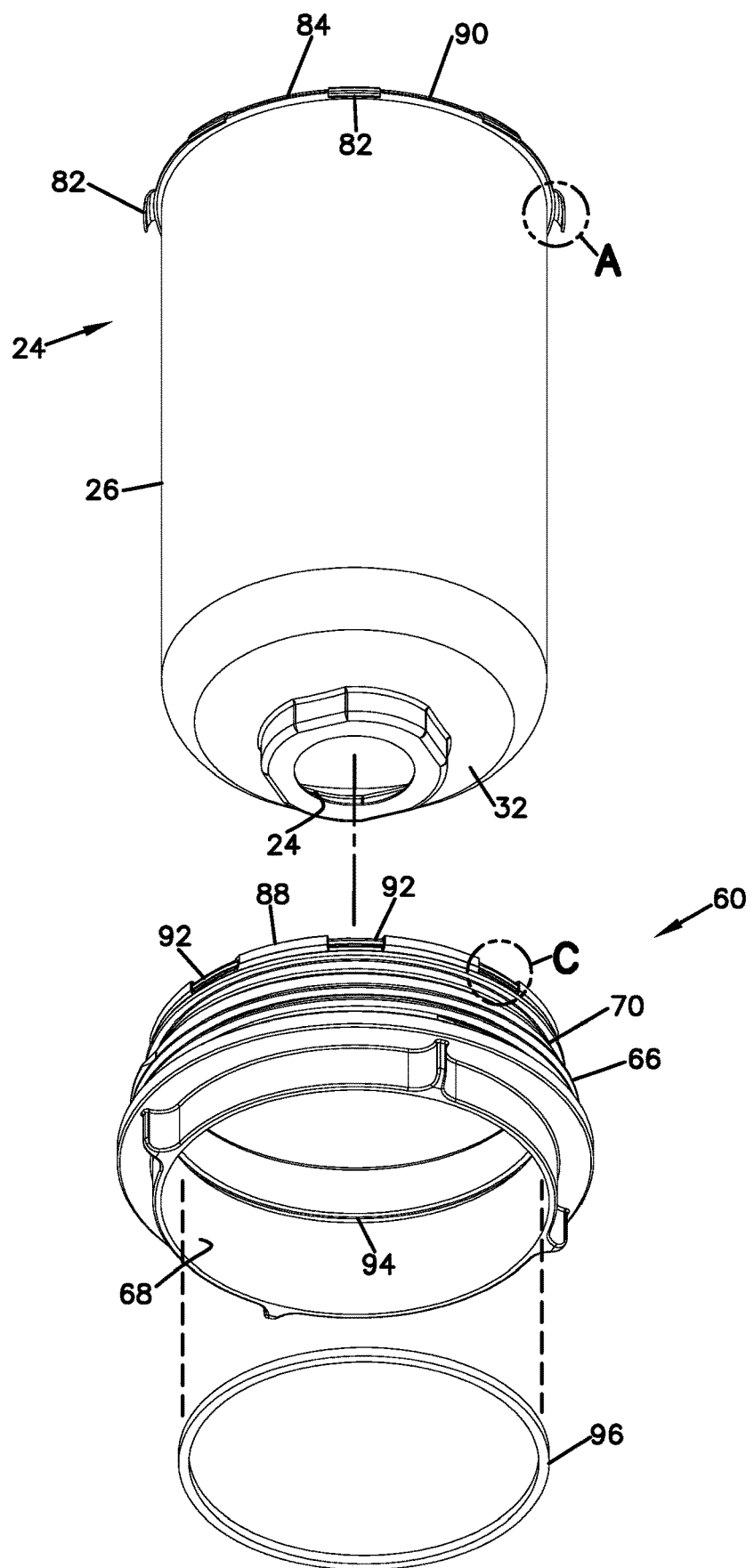
FIG. 5 is an exploded perspective view of the filter housing and sleeve of FIGS. 1-3.
Figure 6:
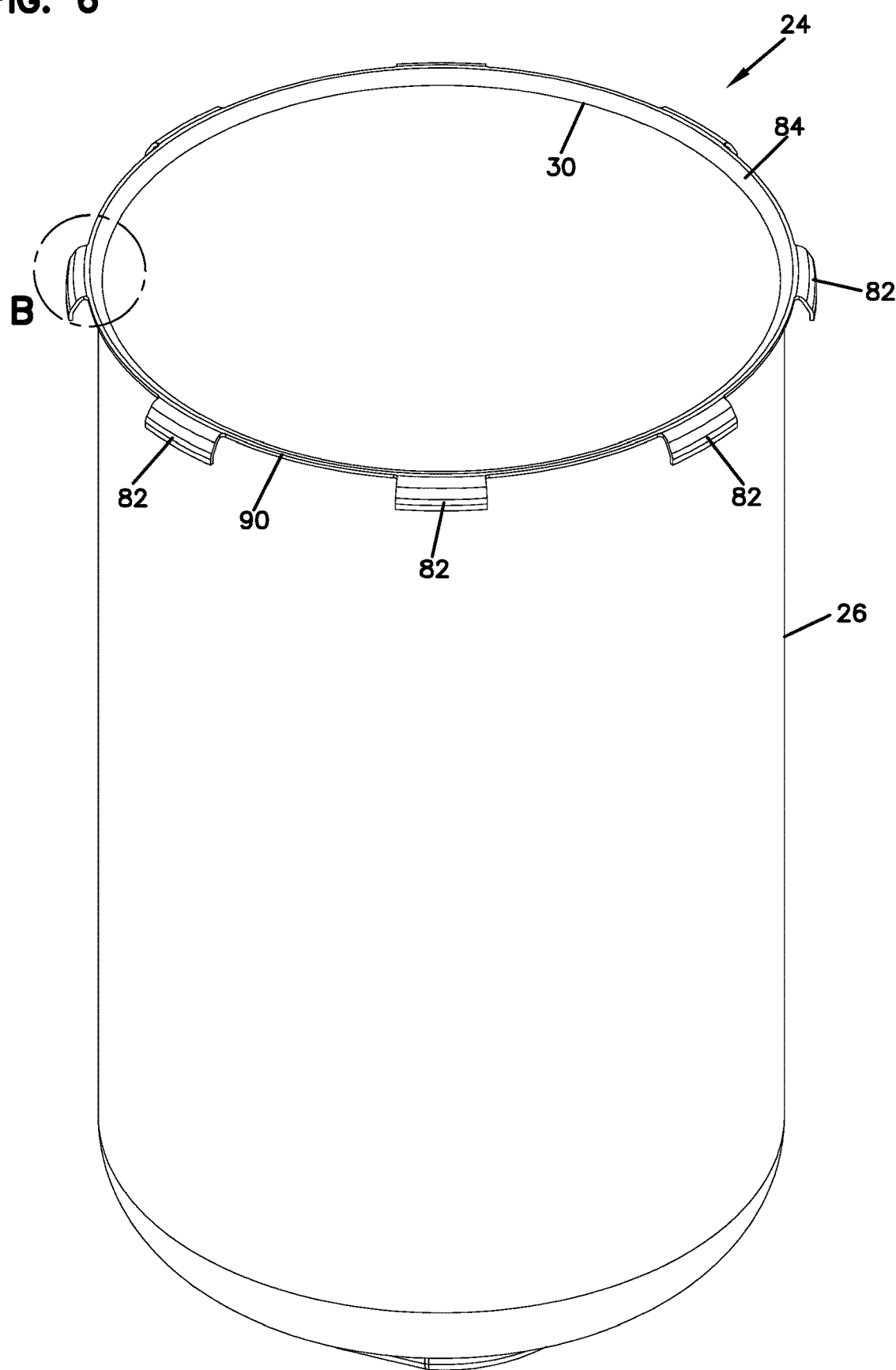
FIG. 6 is a perspective view of the filter housing of FIGS. 1-5.
Figure 7:
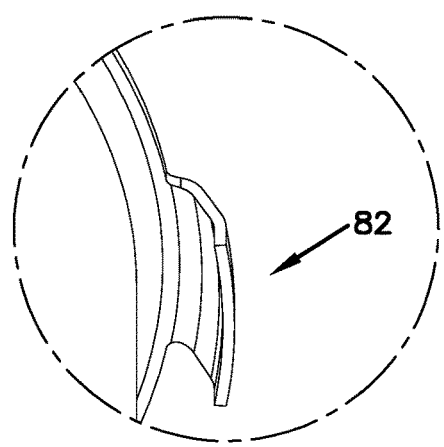
FIG. 7 is an enlarged, perspective view of a portion of detail A of FIG. 5.
Figure 8:
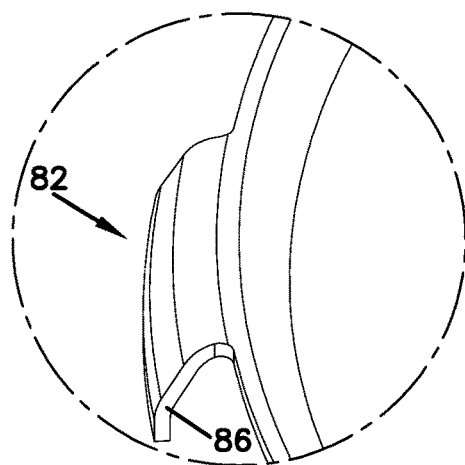
FIG. 8 is an enlarged, perspective view of detail B of FIG. 6.
Figure 9:
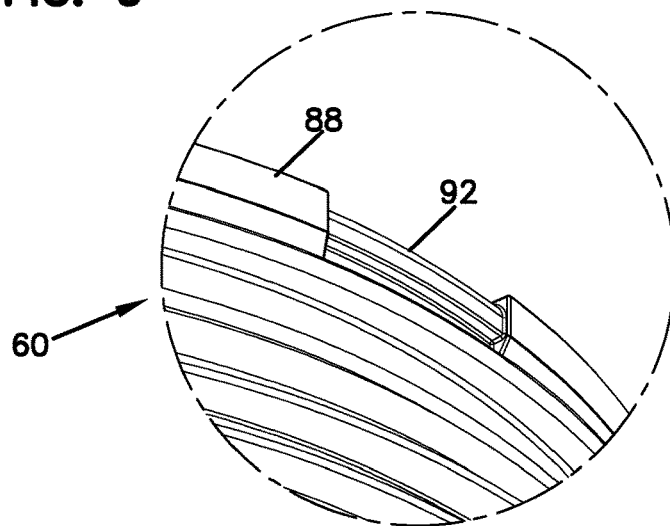
FIG. 9 is an enlarged, perspective view of detail C of FIG. 5.

In FIG. 5, it can be seen how the sleeve 60 defines a seal gland 94 along the sleeve interior 68. The seal gland 94 holds a seal member 96, which forms a radial seal 98 between and against the sleeve 60 and the exterior 62 of the surrounding wall 26.

Figure 1:
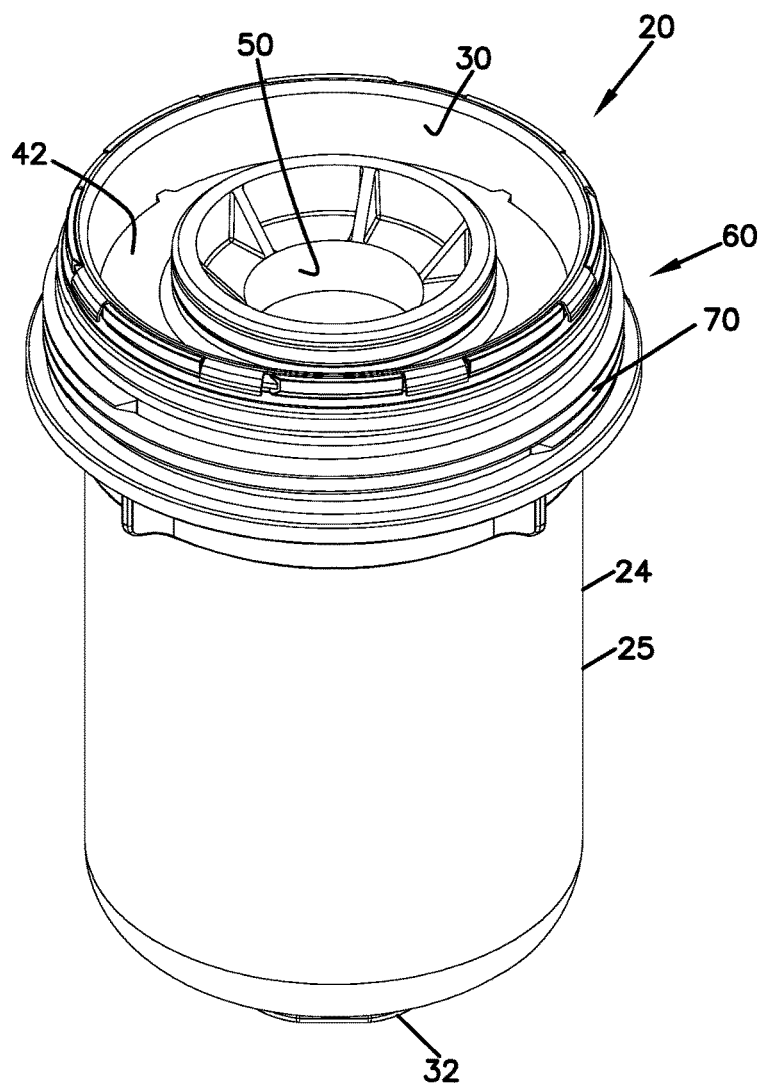
FIG. 1 is a perspective view of a first embodiment of a filter arrangement, constructed in accordance with principles of this disclosure.
Figure 2:
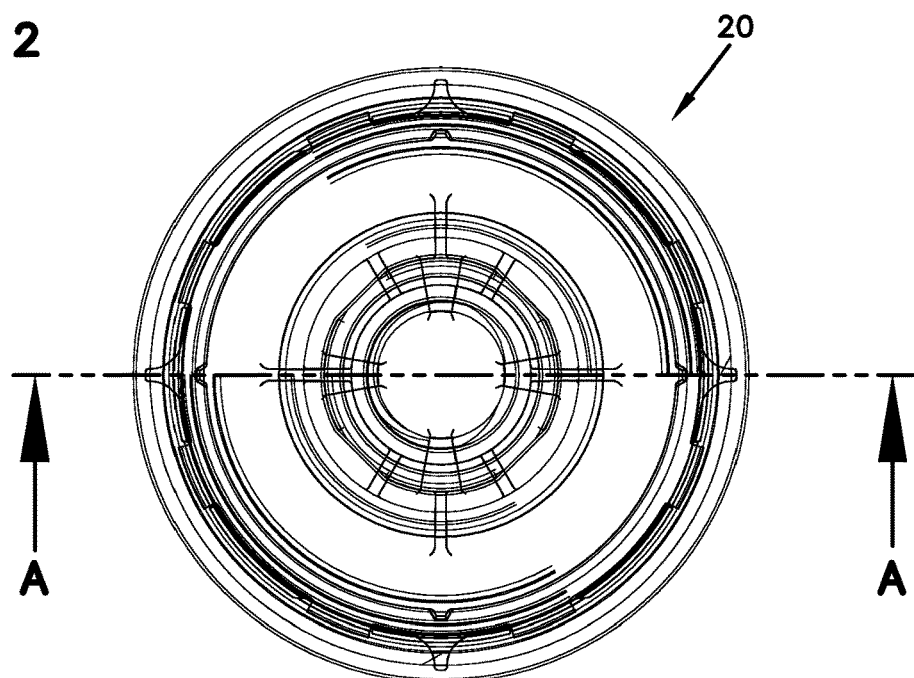
FIG. 2 is a top plan view thereof.
Figure 3:
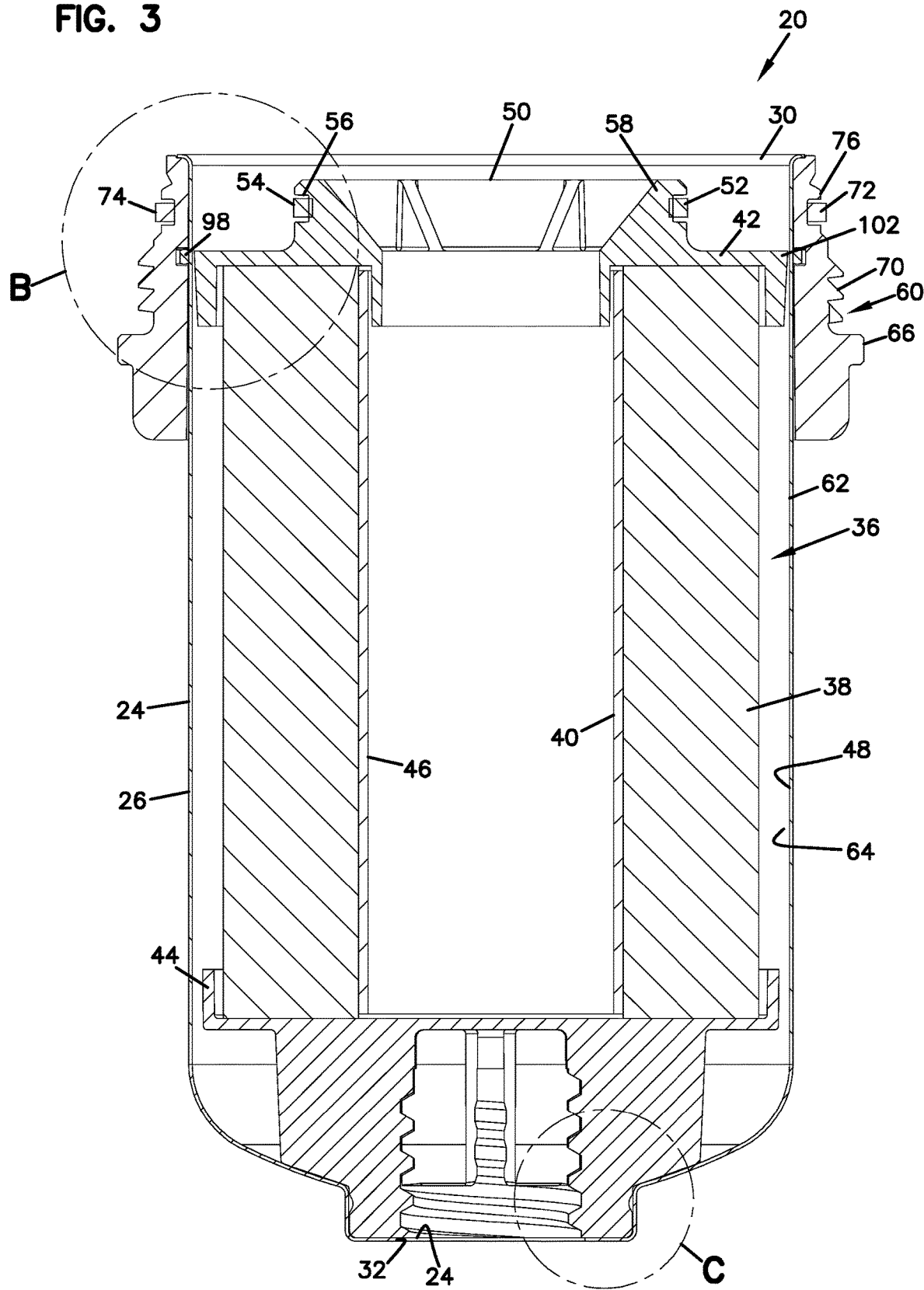
FIG. 3 is cross-sectional view of the embodiment of FIGS. 1 and 2, the cross section being taken along the line A-A of FIG. 2.
Figure 4:
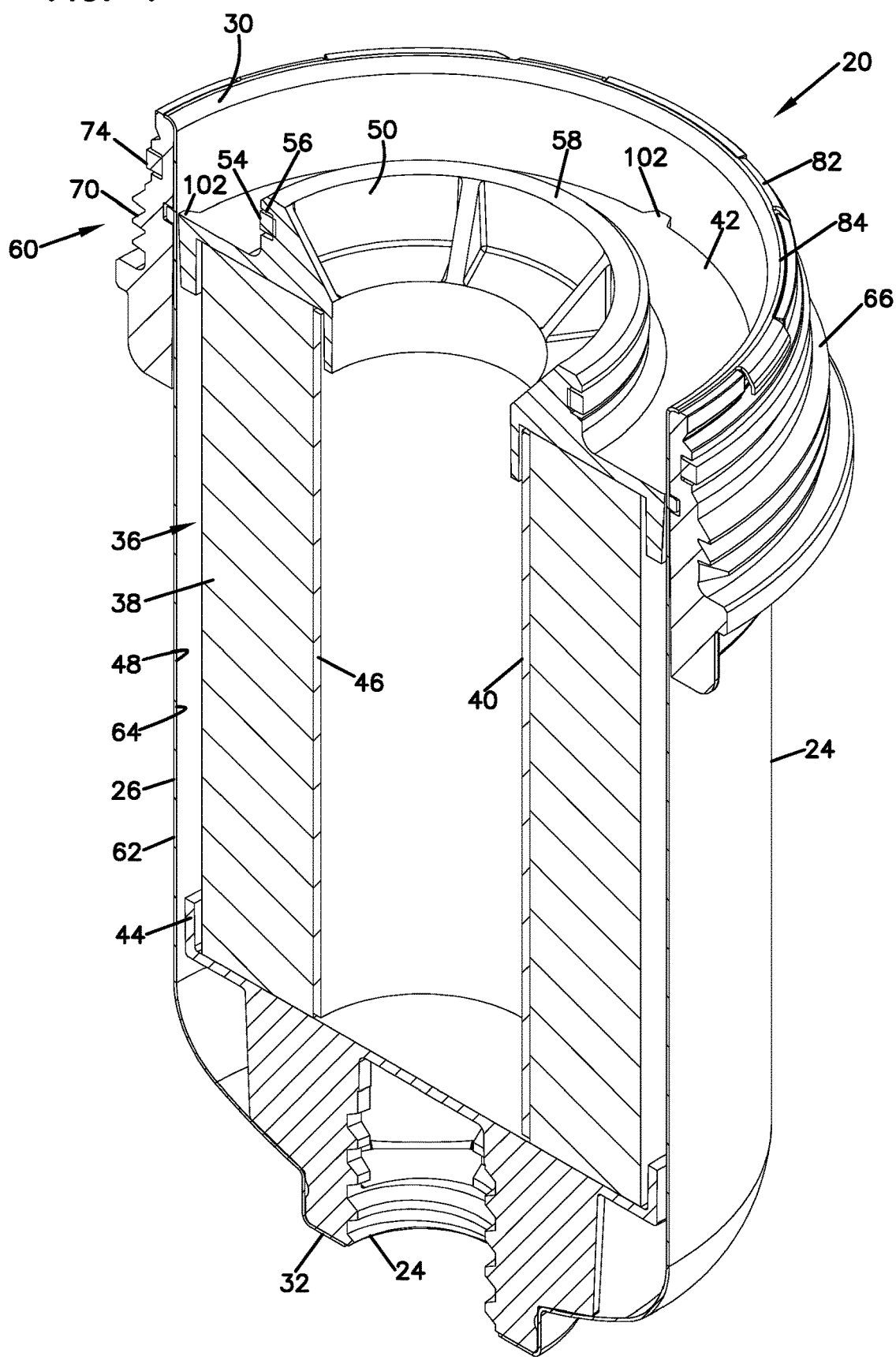
FIG. 4 is a perspective of the cross-sectional view of FIG. 3.
Figure 10:
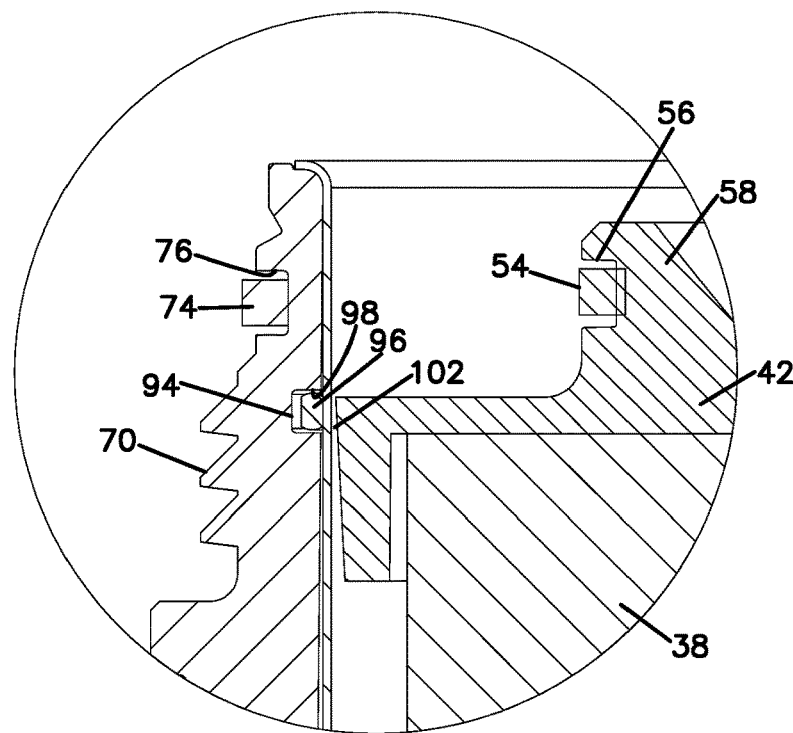
FIG. 10 is an enlarged view of detail B of FIG. 3.
Figure 11:
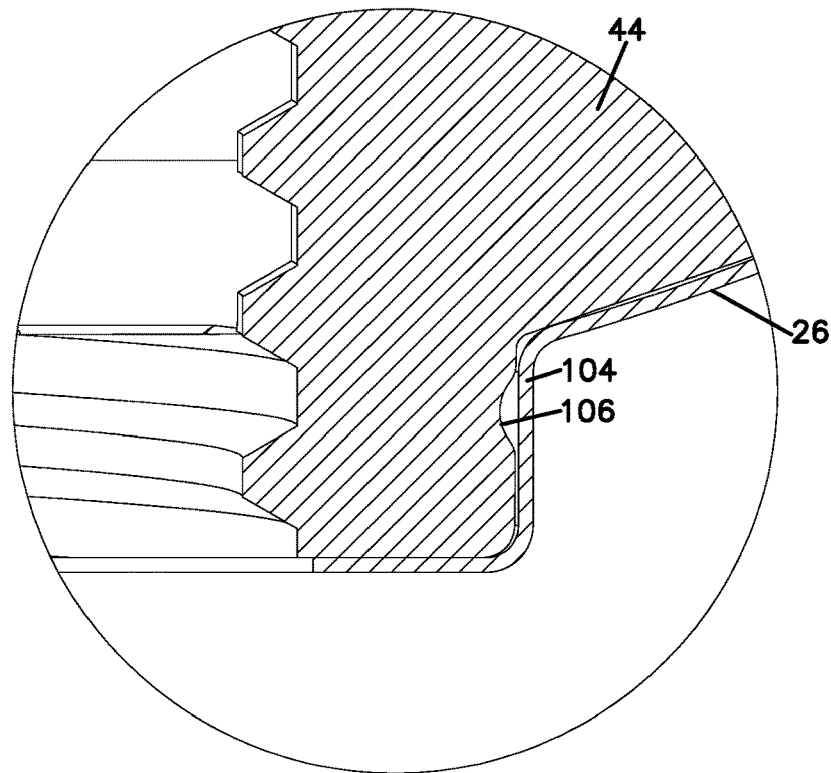
FIG. 11 is an enlarged view of detail C of FIG. 3.
Figure 12:
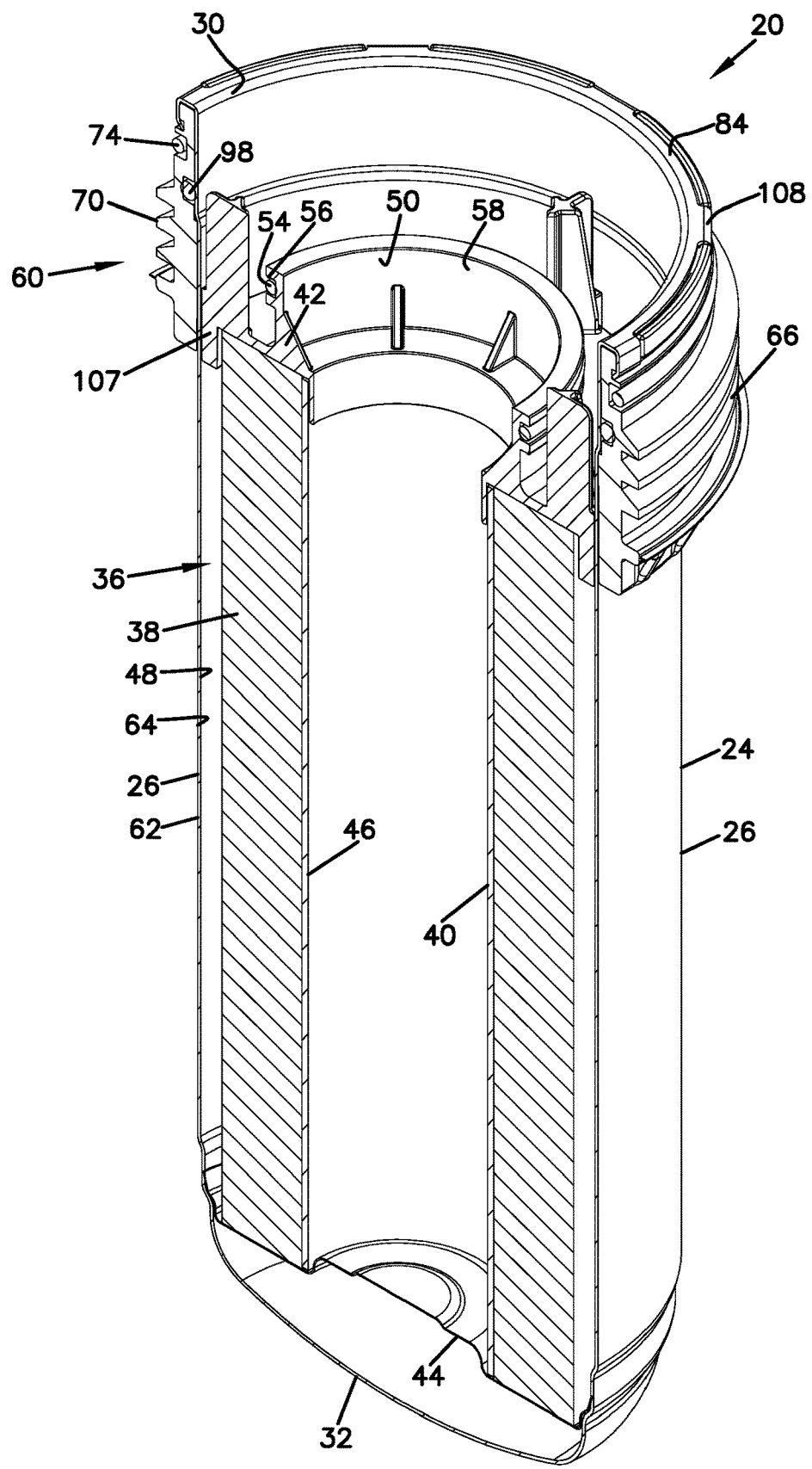
FIG. 12 is a cross-sectional perspective view of another embodiment of a filter arrangement, constructed in accordance with principles of this disclosure.
Figure 13:
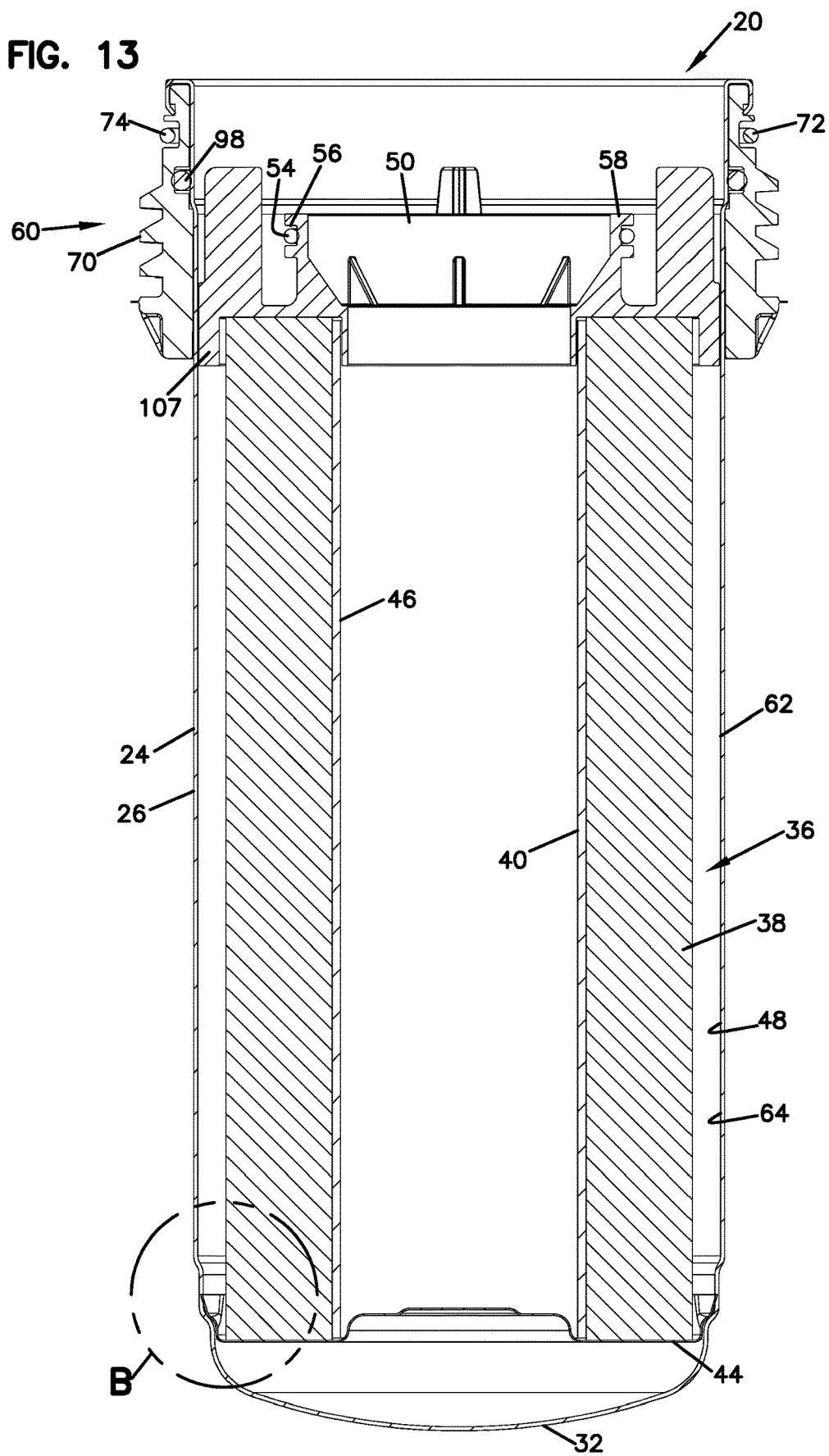
FIG. 13 is the cross-sectional view of the filter arrangement of FIG. 12.
Figure 14:
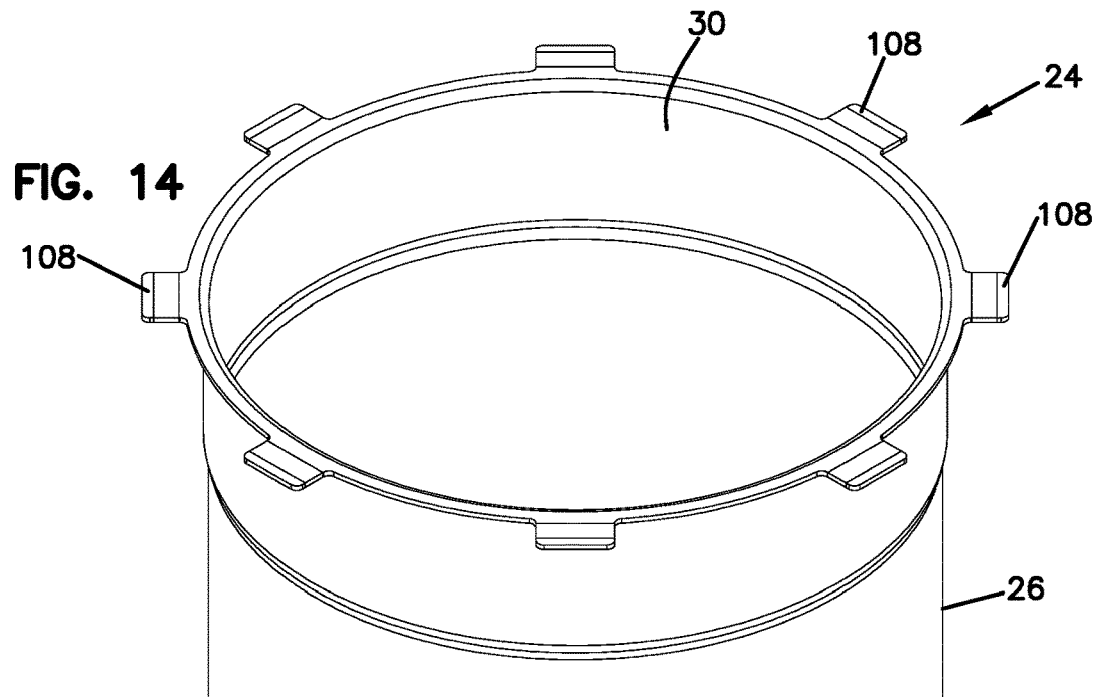
FIG. 14 is a perspective view of an end portion of the filter housing of FIGS. 12 and 13.

In FIGS. 4 and 10, it can be seen how the filter media construction 36 is centered in the housing 24 by a series of guides 102 that are located circumferentially around the outer diameter of the first end cap 42. The guides 102 ensure that the center line of the filter media construction 36 is within acceptable tolerance of the center line of the housing 24.

In this embodiment, the filter media construction 36 is retained in the housing 24 by crimping a lower end 104 of the housing 24 into a recessed area 106 that is defined by the outer surface of the second endcap 44.

2. The Embodiments of FIGS. 12-17

The embodiment of FIGS. 12-17 is similar to the embodiment of FIGS. 1-11, except that tabs 108 are initially in a flat shape, as opposed to a hook shape 86. Once the first rim 88 is engaged against the flange 90 of the housing 24, the tabs 108 are formed or folded over, with the tabs 108 lined up with the slots 92, thereby affixing the sleeve 60 to the housing 24.

Figure 16:
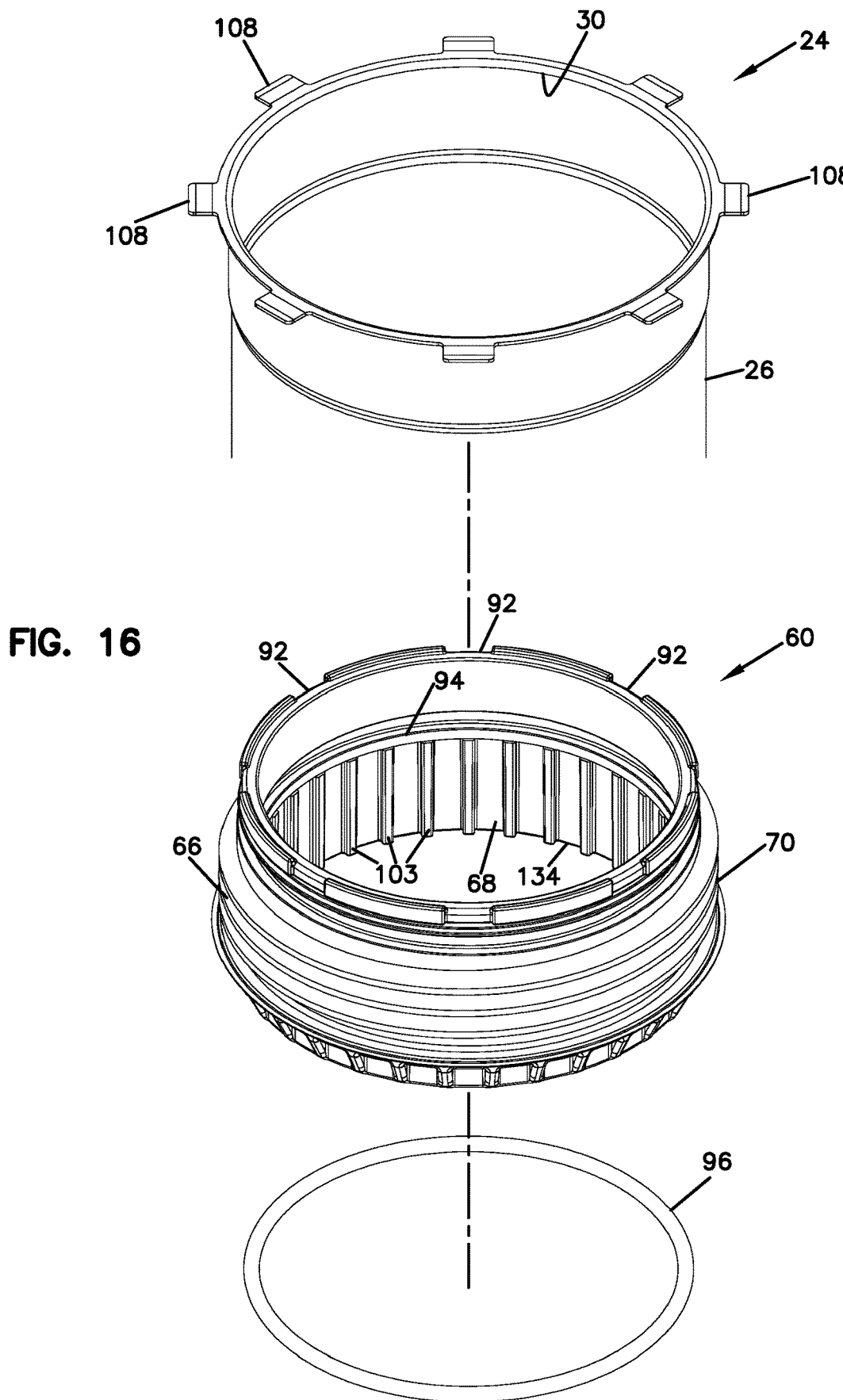
FIG. 16 is an exploded, perspective view of a portion of the filter housing, the sleeve and a seal member utilized in the arrangement of FIGS. 12-15.
Figure 17:
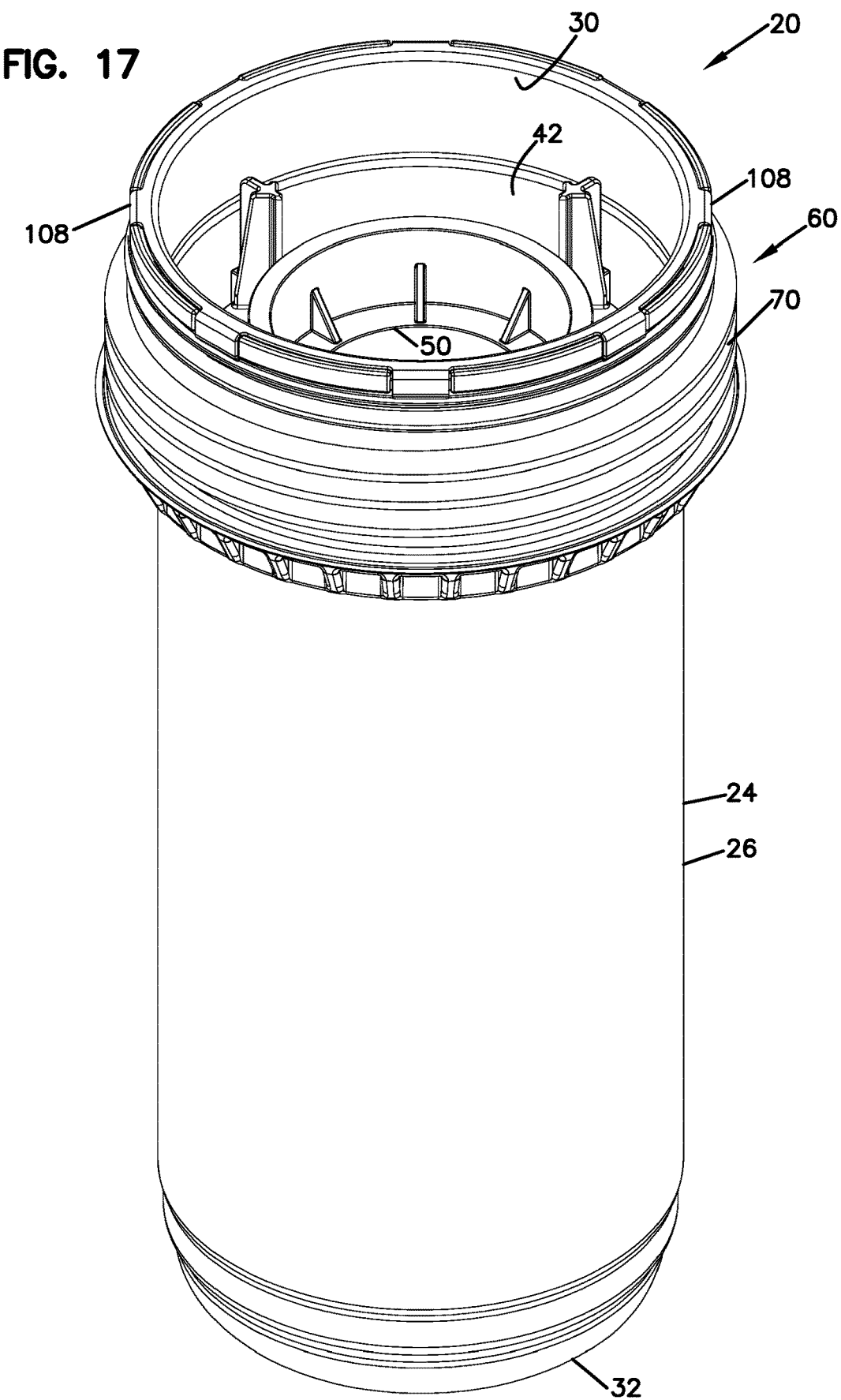
FIG. 17 is a perspective view of the filter arrangement of FIGS. 12-16.
Figure 18:
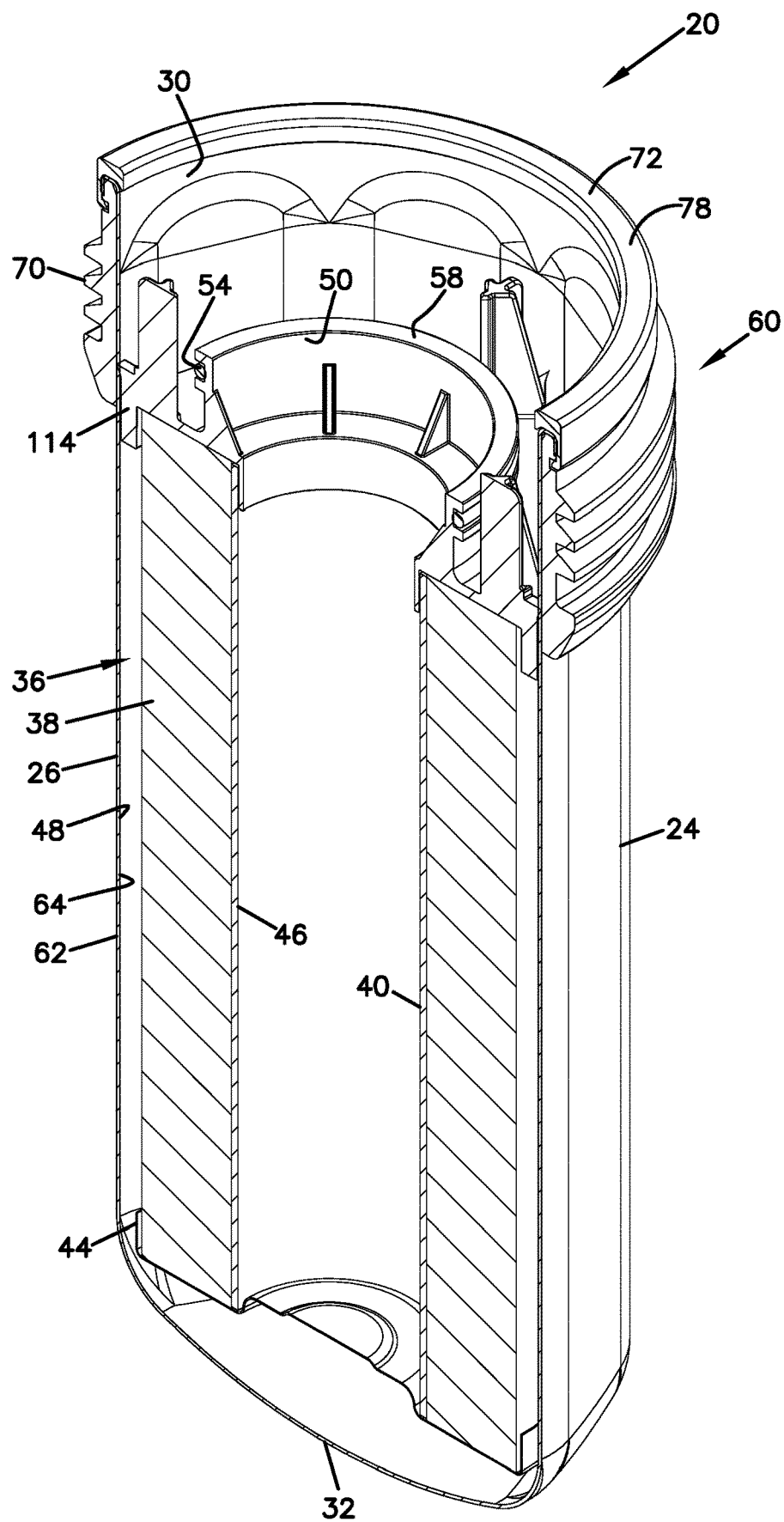
FIG. 18 is a perspective, cross-sectional view of another embodiment of a filter arrangement, constructed in accordance of principles of this disclosure.
Figure 19:
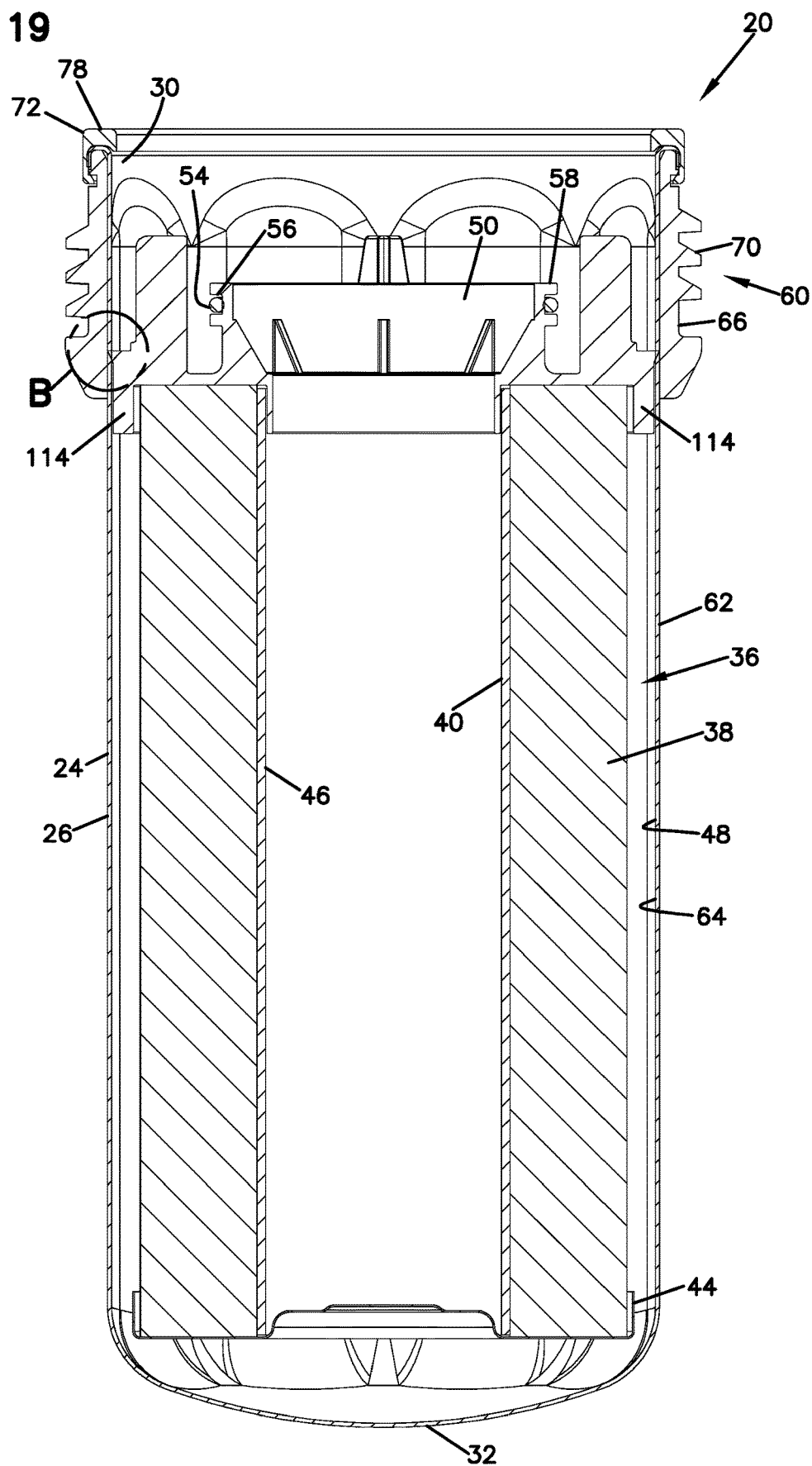
FIG. 19 is the cross-sectional view of the filter arrangement of FIG. 18.
Figure 20:
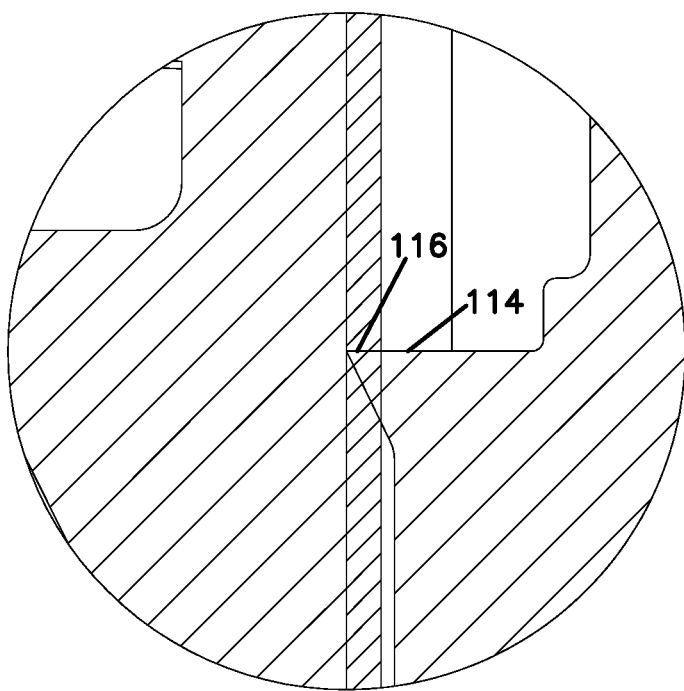
FIG. 20 is an enlarged, cross-sectional view of the portion shown in detail B of FIG. 19.
Figure 21:
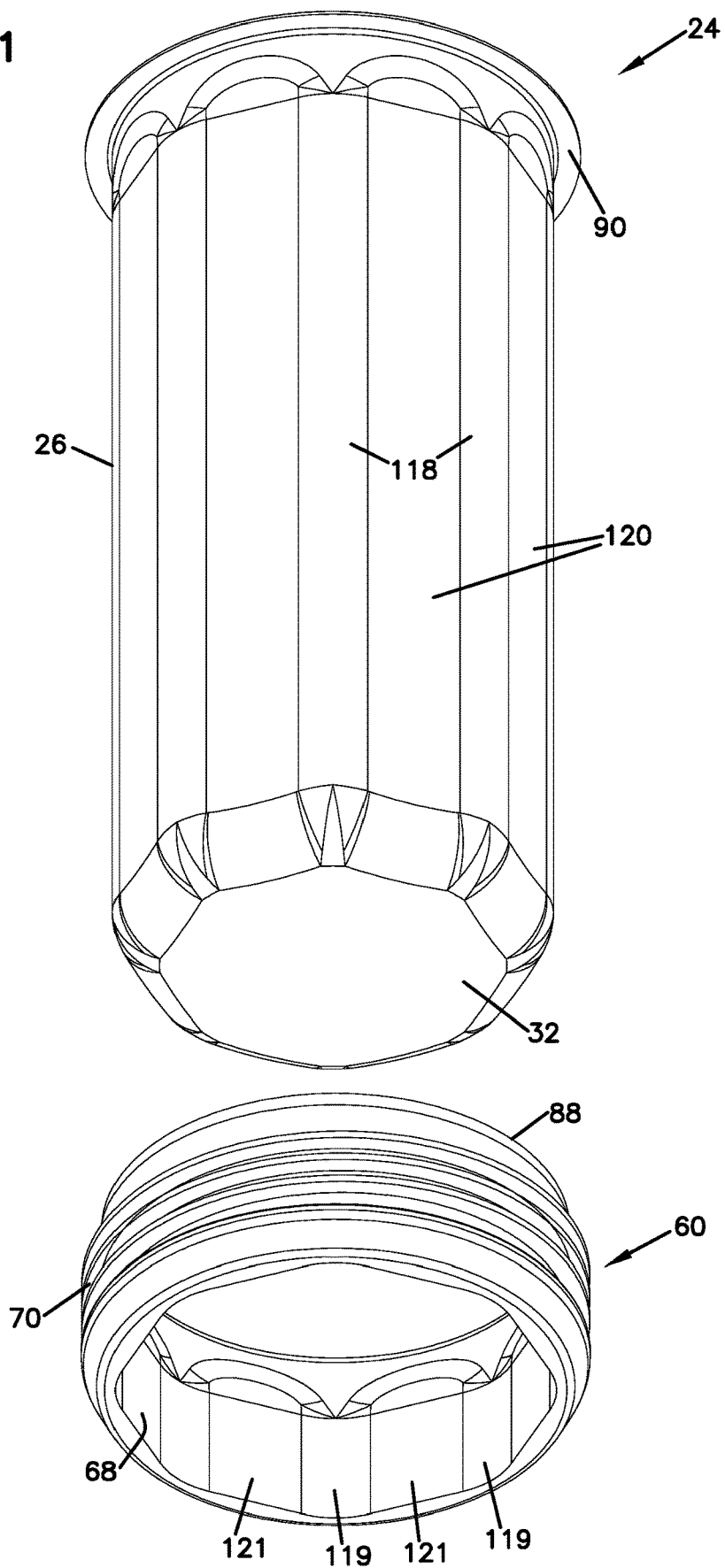
FIG. 21 is an exploded, perspective view of the housing and filter sleeve of FIGS. 18 and 19.
Figure 22:
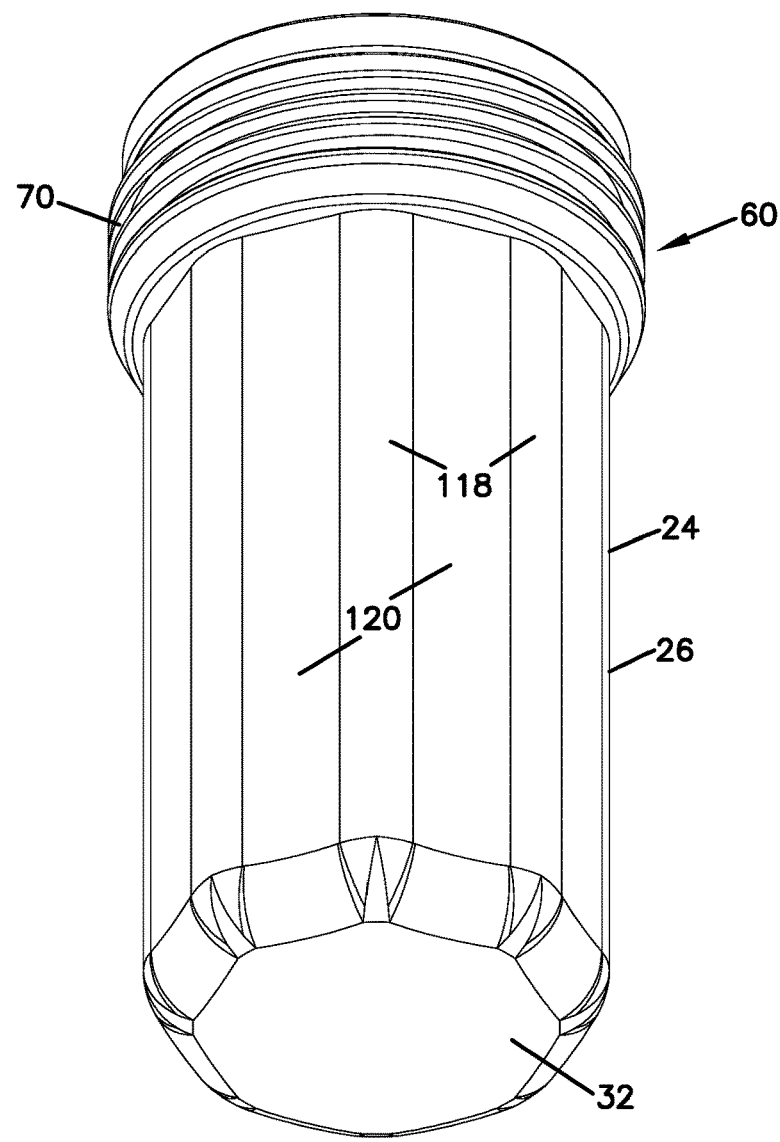
FIG. 22 is a perspective view of the filter housing and sleeve of FIGS. 18 and 21.
Figure 23:
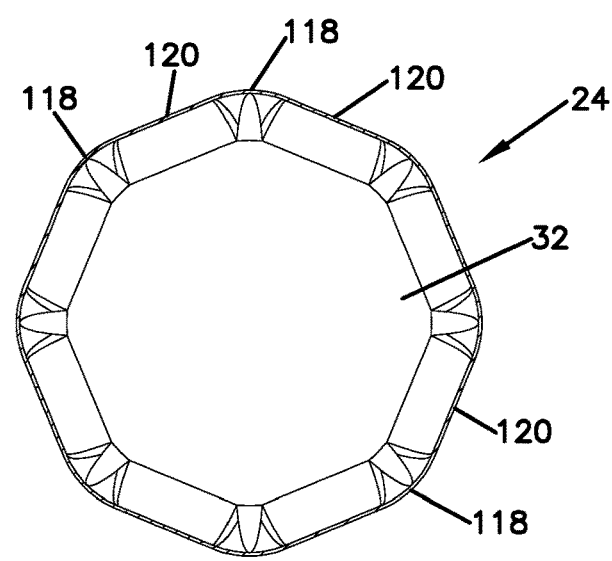
FIG. 23 is a bottom plan view of the filter housing of FIGS. 18, 19, and 21.
Figure 24:
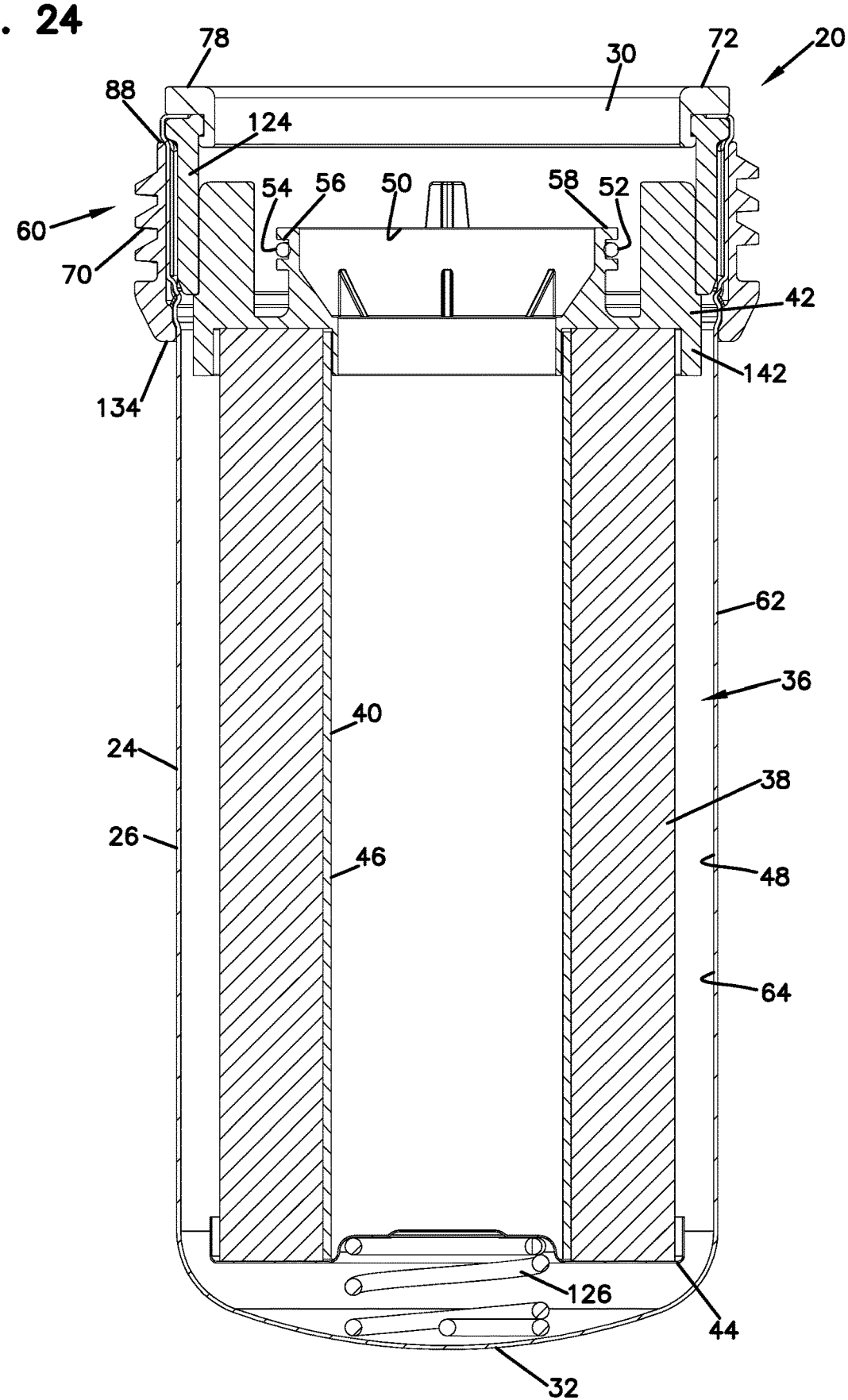
FIG. 24 is a cross-sectional view of another embodiment of a filter arrangement constructed in accordance with principles of this disclosure.
Figure 25:
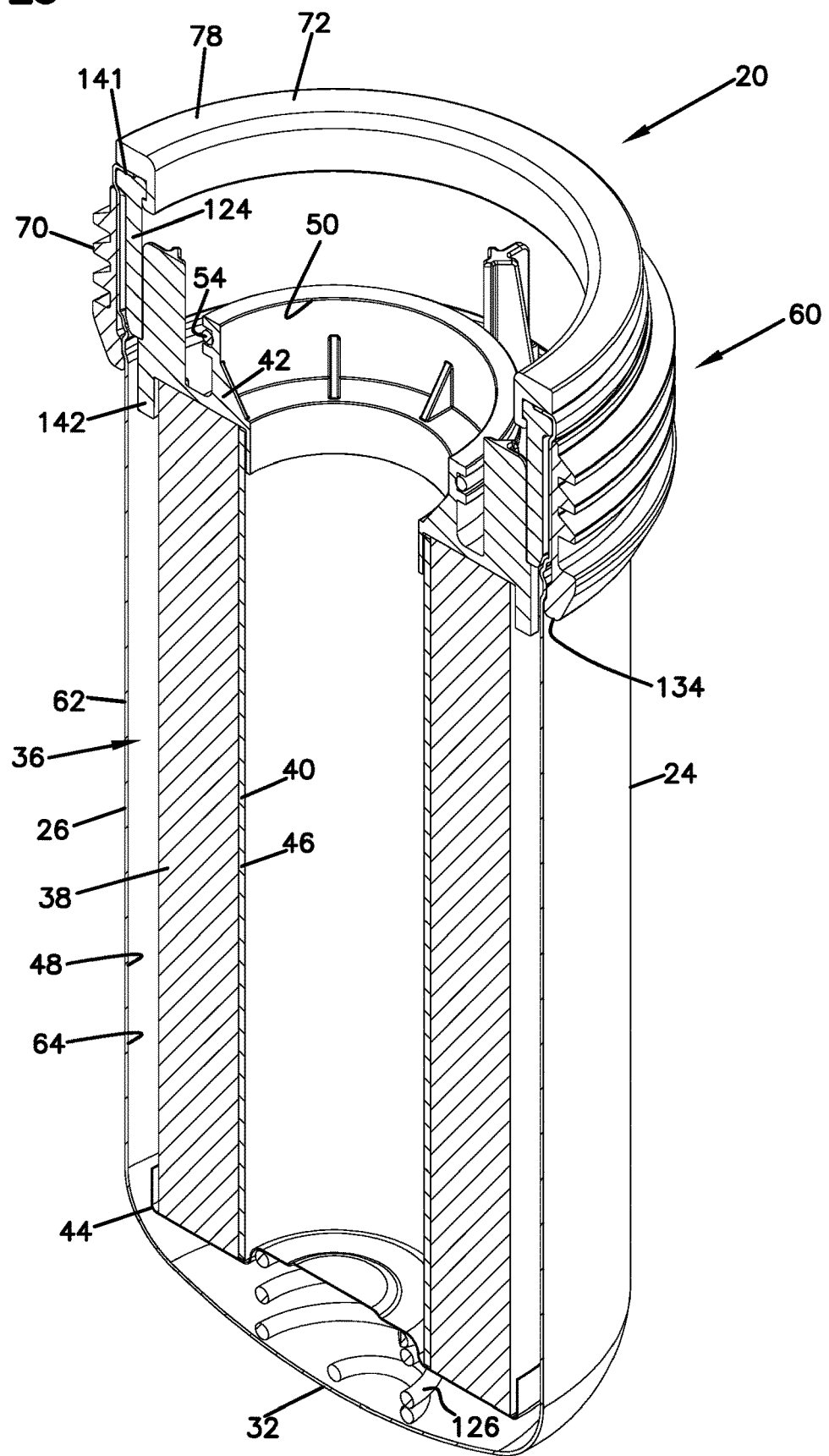
FIG. 25 is a perspective view of the cross-section of FIG. 24.
Figure 26:
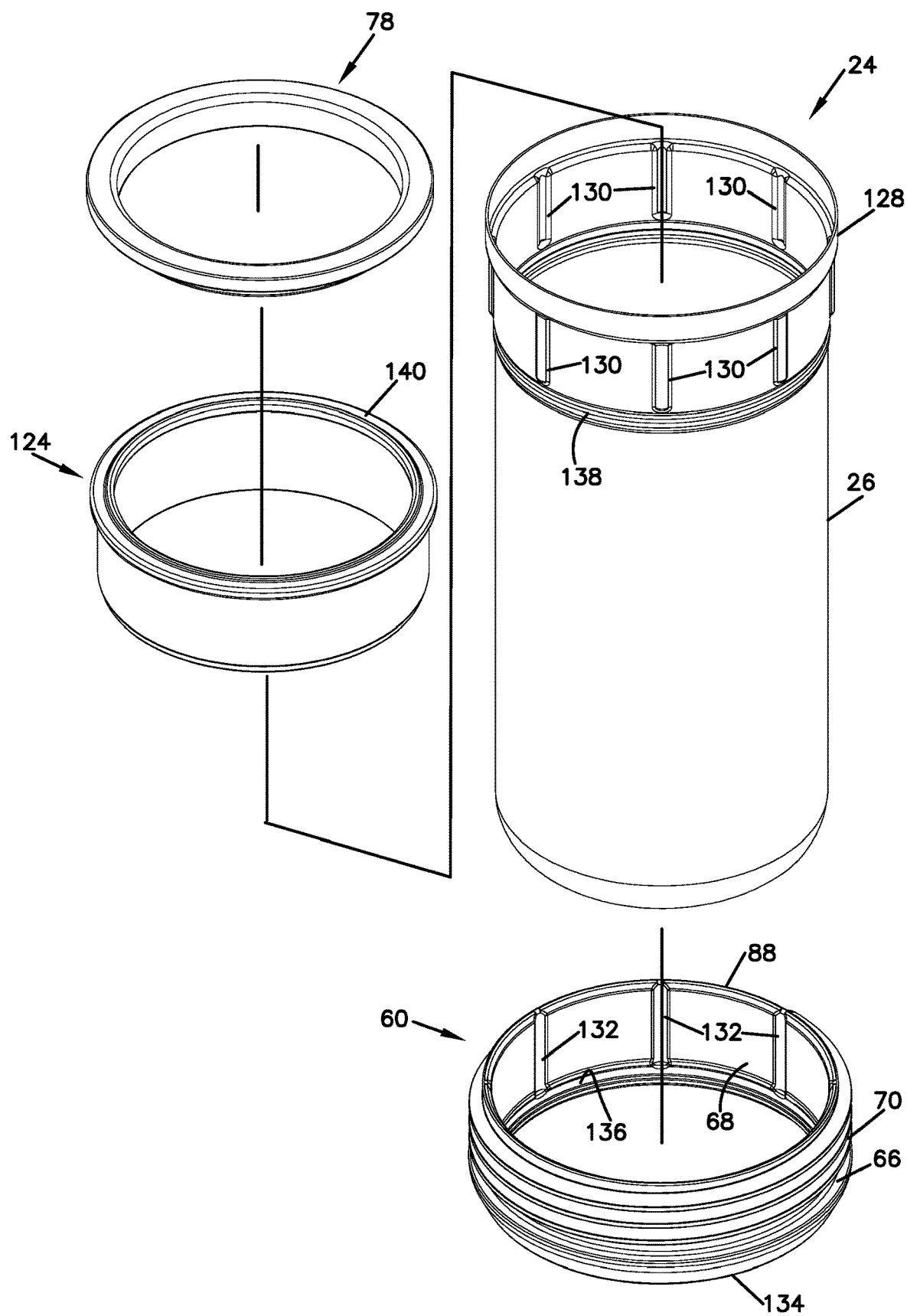
FIG. 26 is an exploded, perspective view of components of the filter arrangement of FIGS. 24 and 25, but without showing the filter media construction.
Figure 27:
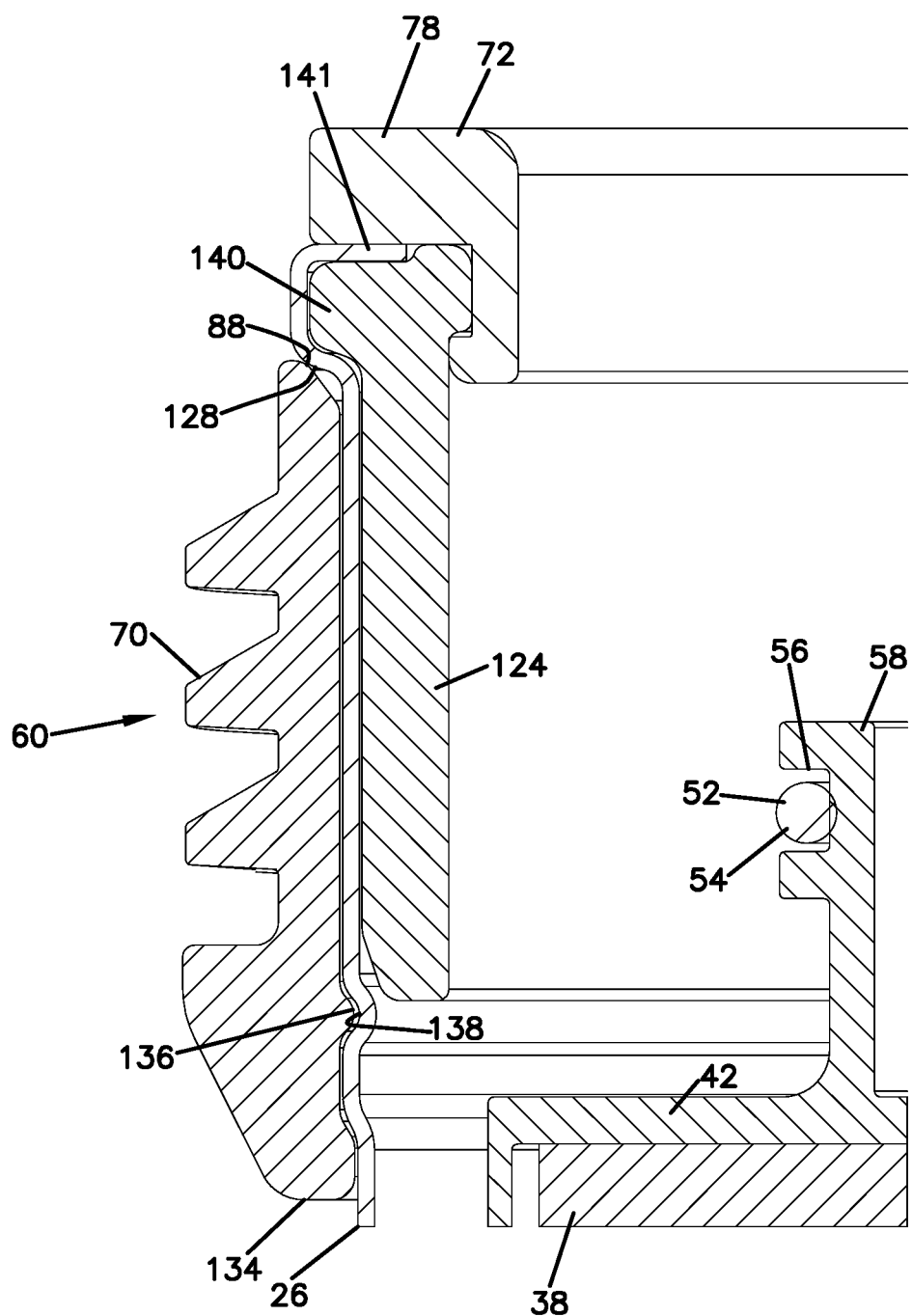
FIG. 27 is an enlarged, cross-sectional view of a portion of the filter arrangement depicted in FIGS. 24 and 25.
Figure 28:
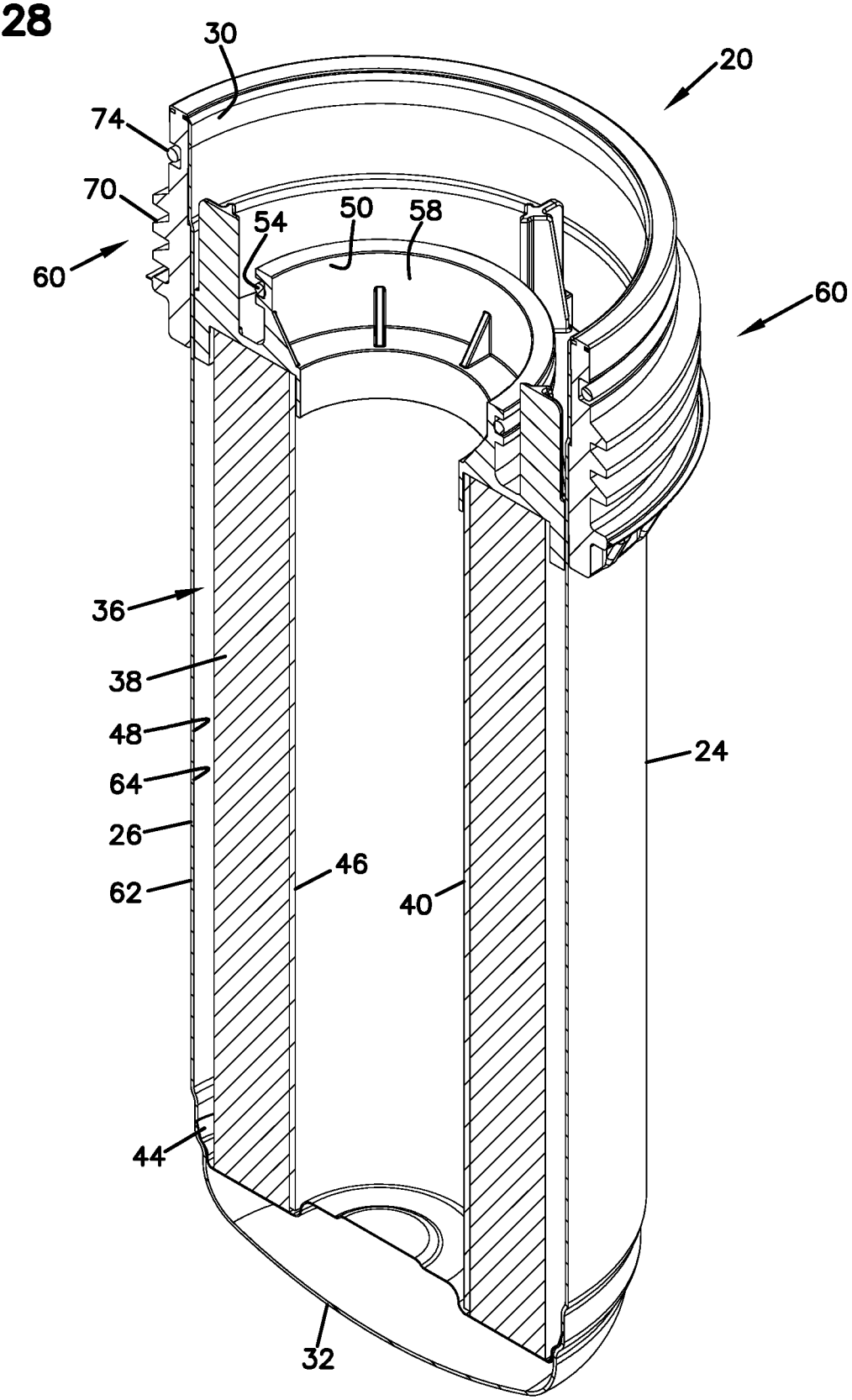
FIG. 28 is a cross-sectional, perspective view of another embodiment of a filter arrangement, constructed in accordance with principles of this disclosure.
Figure 29:
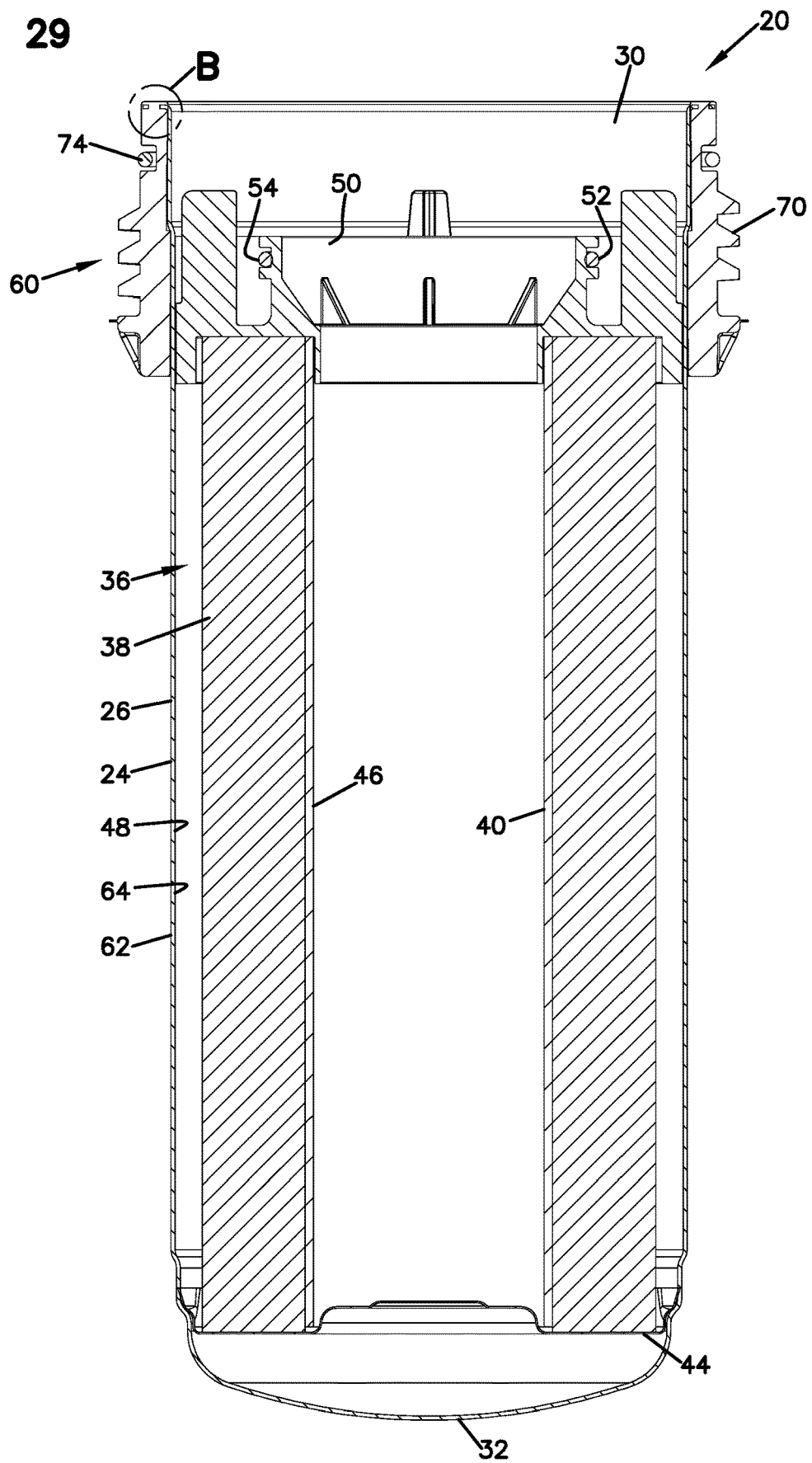
FIG. 29 is the cross-sectional view of the filter arrangement of FIG. 28.
Figure 31:
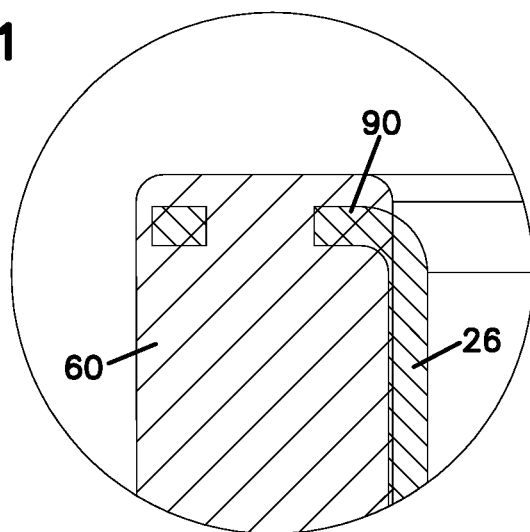
FIG. 31 is an enlarged, cross-sectional view of detail B of FIG. 29.
Figure 30:
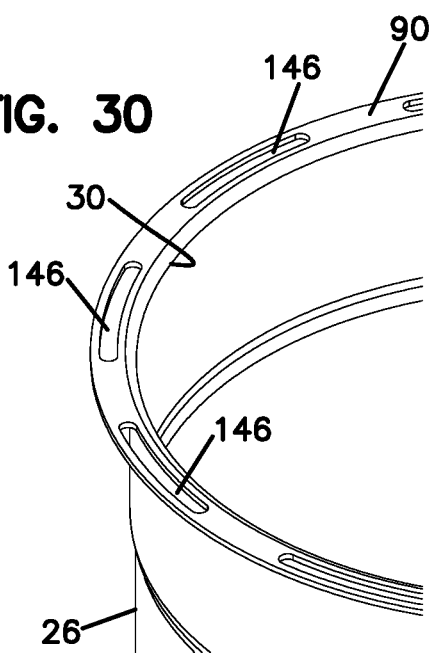
FIG. 30 is an enlarged, perspective view of a portion of the filter housing, before the remaining components of the filter arrangement are attached.
Figure 32:
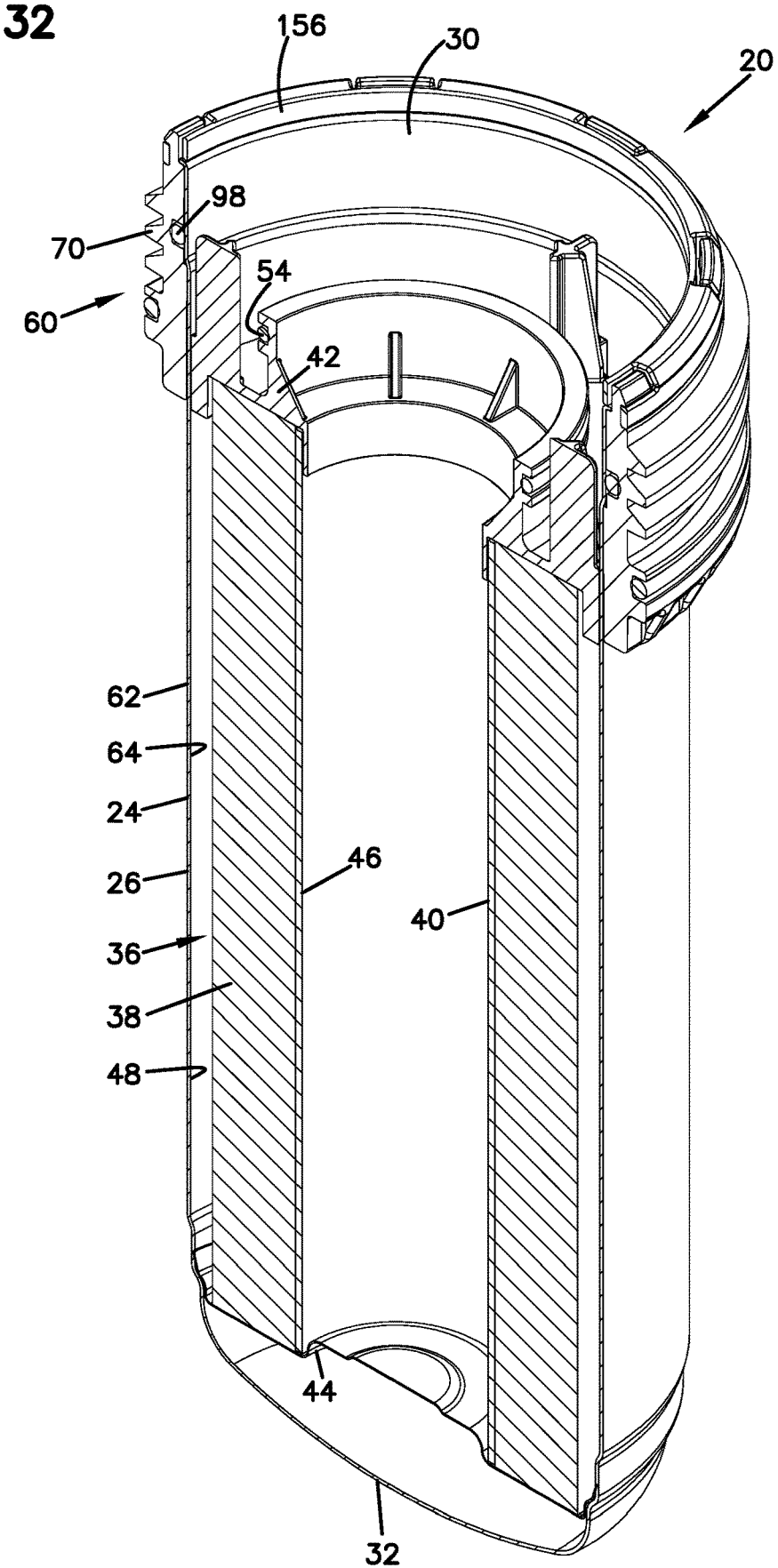
FIG. 32 is a cross-sectional, perspective view of another embodiment of a filter arrangement, constructed in accordance with principles of this disclosure.
Figure 33:
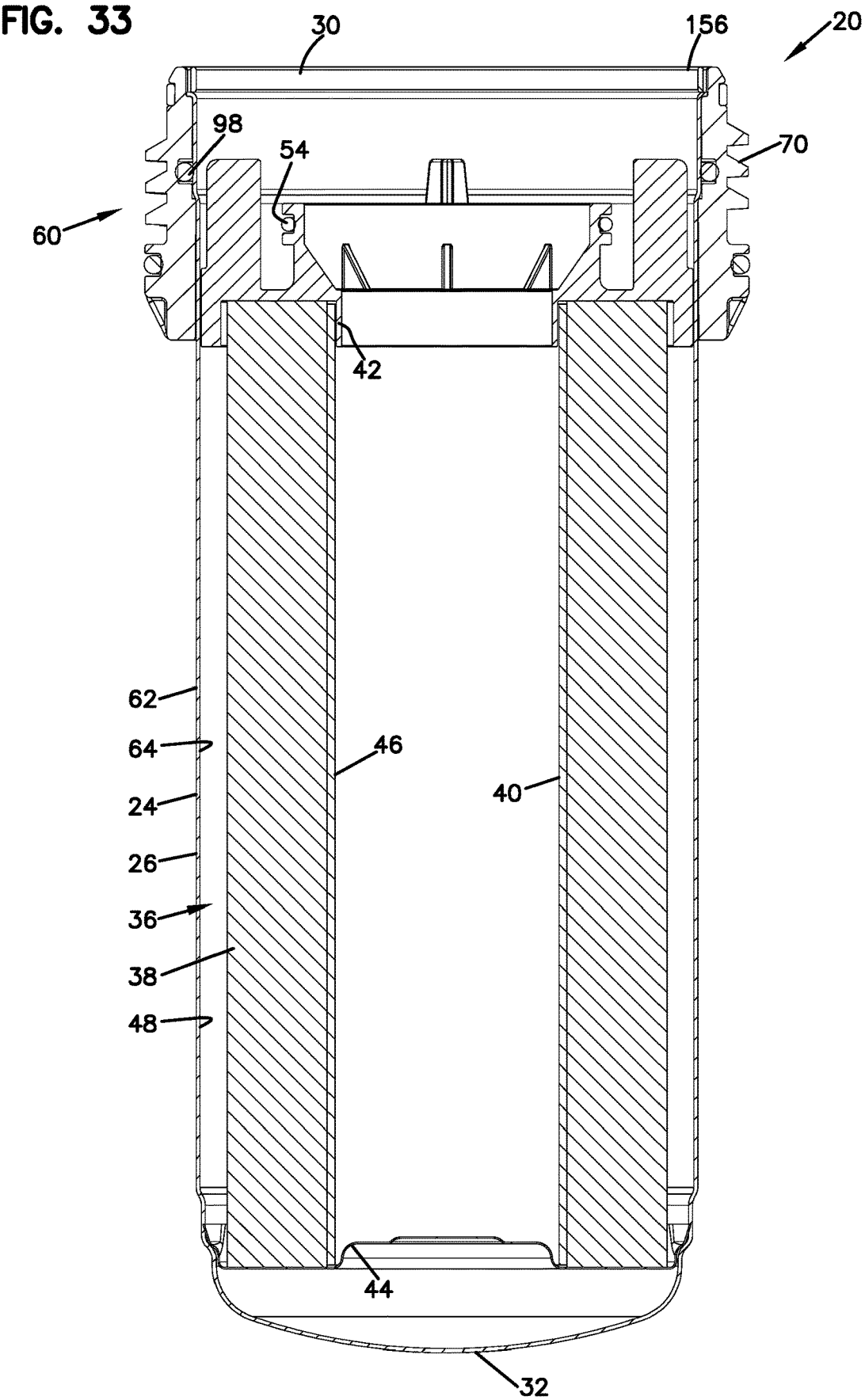
FIG. 33 is the cross-sectional view of the filter arrangement of FIG. 32.
Figure 34:
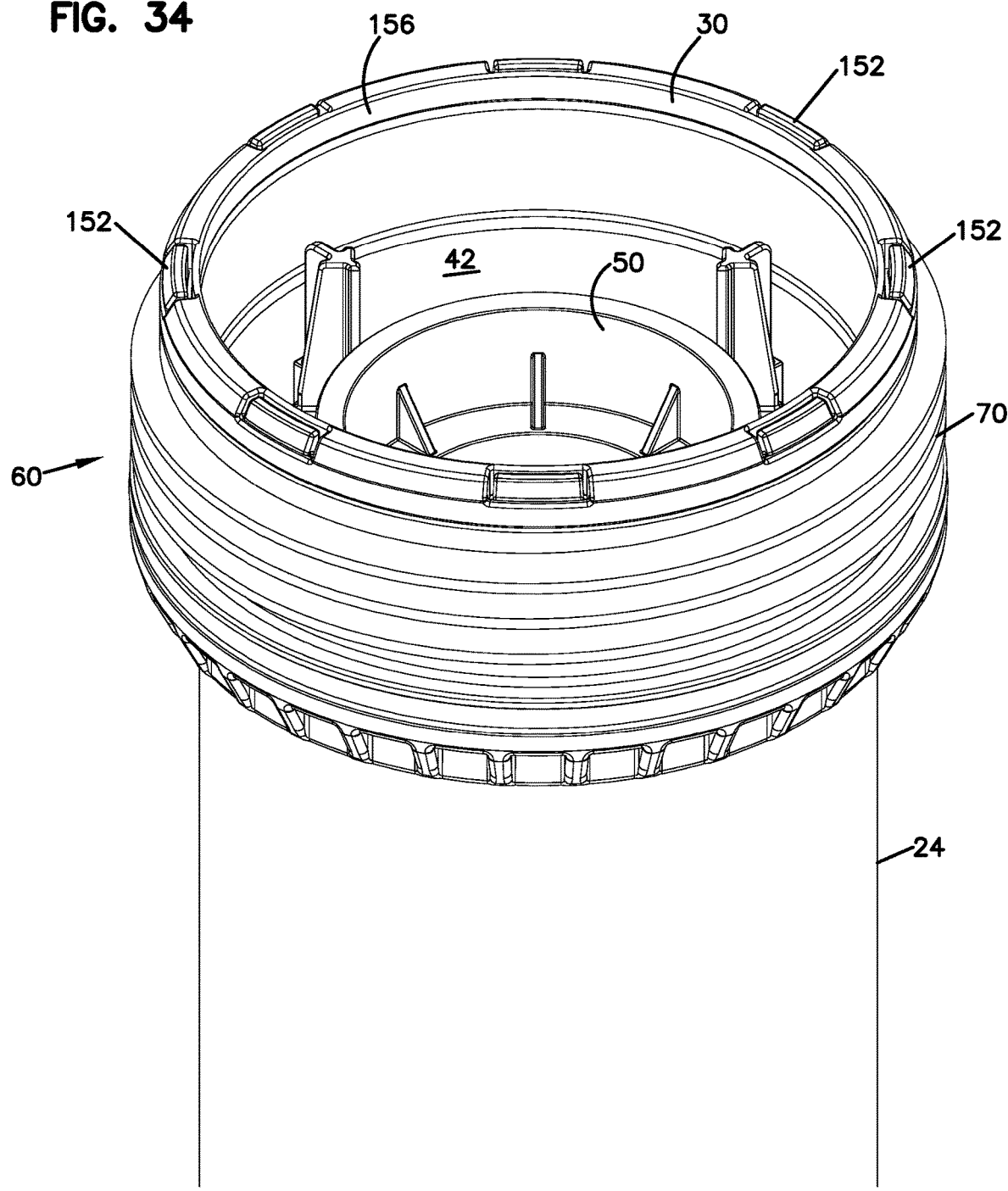
FIG. 34 is a partial, perspective view of the filter arrangement of FIGS. 32 and 33.
Figure 35:
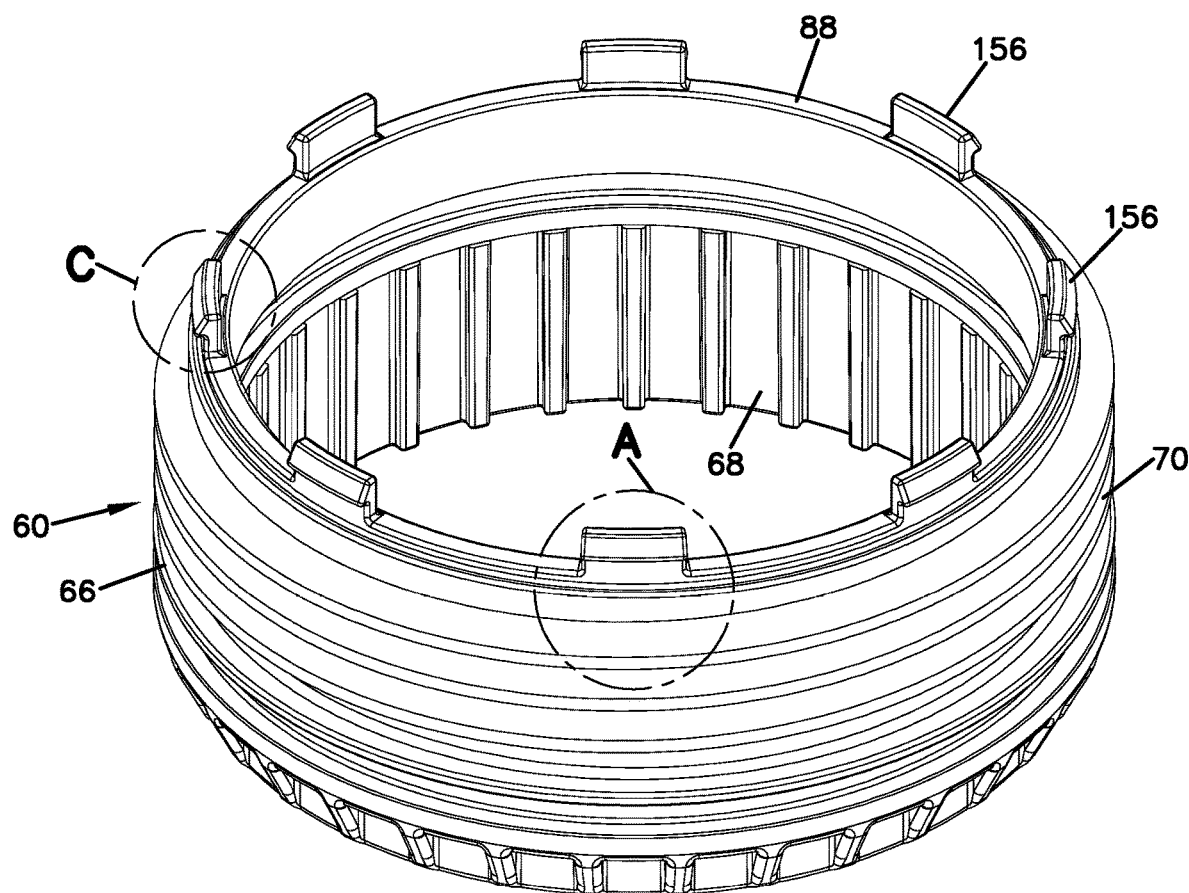
FIG. 35 is a partial, exploded, perspective view of selected components of the filter arrangement of FIGS. 32-34.
Figure 36:
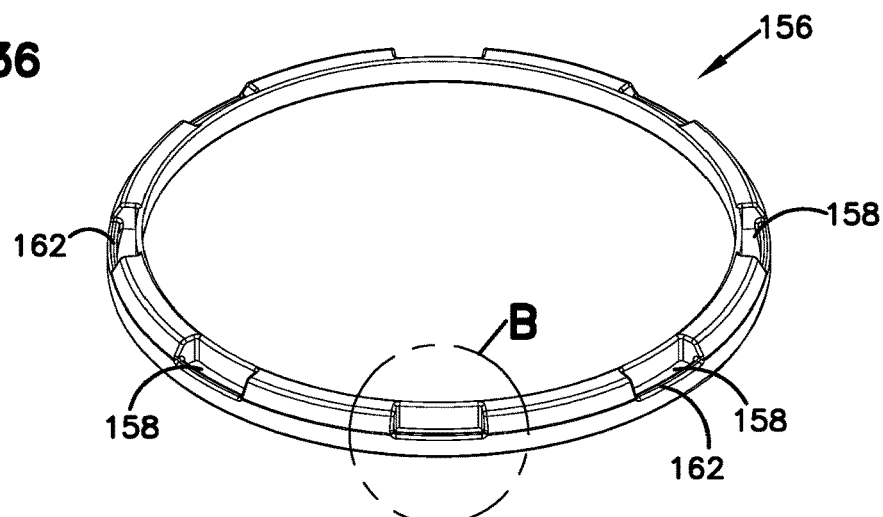
FIG. 36 is an enlarged, perspective view of detail B of FIG. 35.
Figure 37:
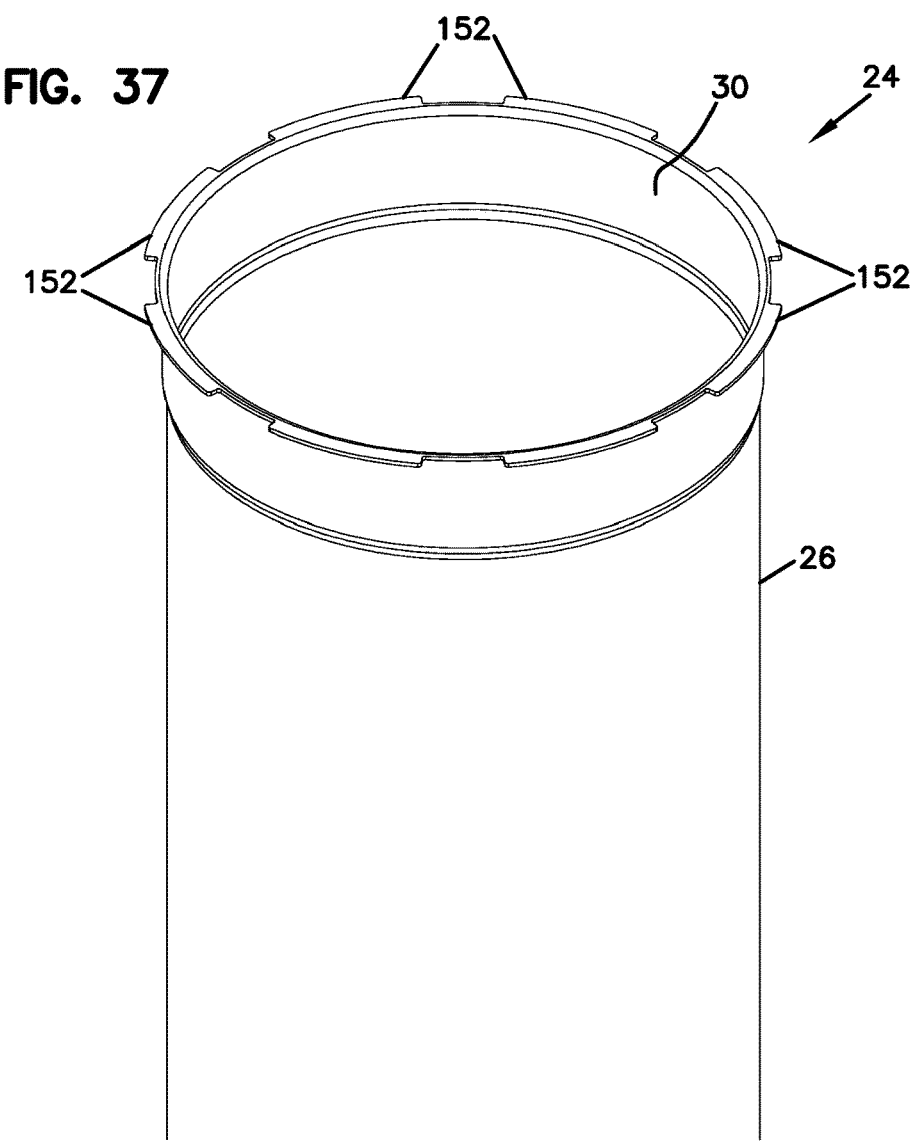
FIG. 37 a perspective view of a portion of the filter housing of FIGS. 32 and 33.

In the example embodiment of the sleeve 60 depicted in FIG. 16, the sleeve includes a plurality of ribs 103 extending longitudinally along the interior 68 from the seal gland 94 to a second rim 134. The ribs 103 act as structural supports for the threads. They transfer the radial load on the threads to the housing 26. Ribs are used instead of a solid section to improve moldability when making the sleeve out of plastic.

This embodiment also includes structure on the first end cap 42 to help with centering the filter cartridge 36 within the housing 24. In this embodiment, the end cap 42 includes a plurality of projecting tabs 107 that are between the interior 64 of the housing wall 26 and the outer diameter of the filter media 38. The projecting tabs 107 have structure that project axially in a direction toward the mouth 30, as well, which can be used to cooperate with a corresponding filter head 22.

Figure 15:
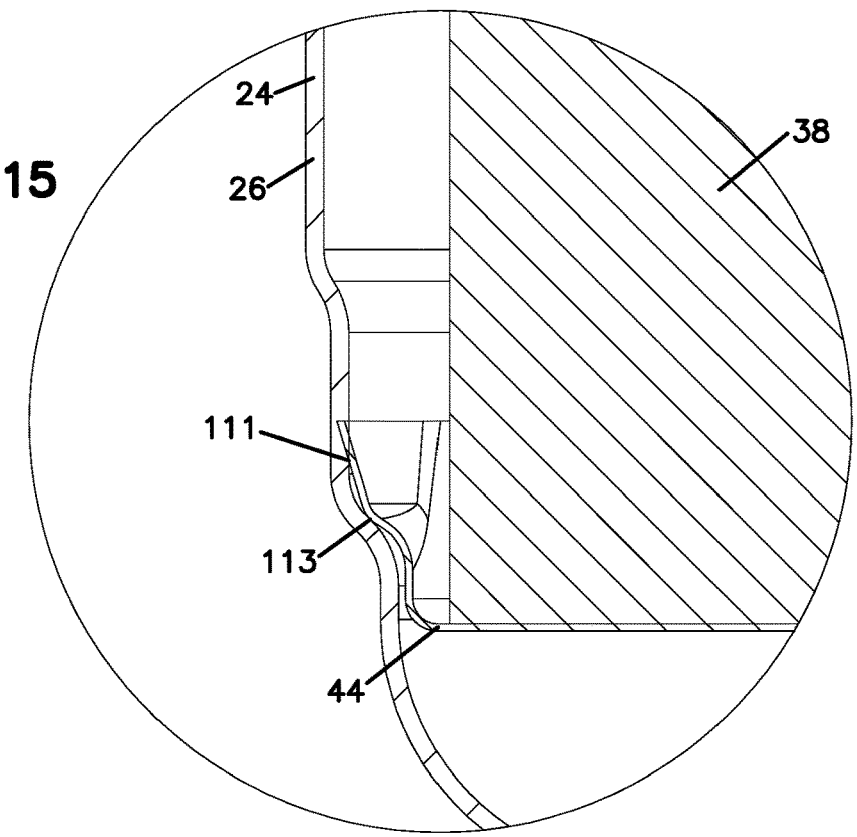
FIG. 15 is an enlarged cross-sectional view of detail B of FIG. 13.

In FIG. 15, it can be seen how, in this embodiment, the filter media construction 36 is retained in the housing 24 by a press fit between the outer edge 111 of the second end cap 44 and an inwardly extending projection 113 of the surrounding wall 26 of the housing 24.

3. The Embodiment of FIGS. 18-23

In this embodiment, a series of guides 114 are part of the first end cap 42 and extend between an outer diameter of pleated media and the interior 64 of the wall 26. The guides 114 are used to center the filter media construction 36 in the housing 24. A raised section 116 (FIG. 20) at the corner of the guides 114 are used to create an interference fit between the filter media construction 36 and the housing 24, allowing the filter media construction 36 to remain with the housing 24 when the filter arrangement 20 is removed from the filter head 22.

As with the previous designs, the sleeve 60 is slid up the housing wall 26, until the first rim 88 engages against the flange 90 of the wall 26 adjacent to the mouth 30. The flange 90 is formed or bent over the first rim 88 of the sleeve 60, in a manner to clinch it or hold it to the housing 24, such that the sleeve 60 cannot move axially relative to the housing 24.

In this embodiment, the surrounding wall 26 defines a non-round shape, including at least one curved segment 118 and at least one curved segment of a larger radius or a straight segment 120. The interior 68 of the sleeve 60 has a non-round shape that generally matches the non-round shape of the surrounding wall 26. This non-round shape can be a variety of geometries, as long as it acts to resist relative rotation between the sleeve 60 and the housing 24. In the embodiment shown, there is a series of curved segments 119 and straight segments 121 symmetrically located around the exterior 64 of the wall 26 and interior 68 of the sleeve 60. This provides for a snug fit between the sleeve 60 and housing 24.

With the face seal member 78 resting on the top of the flange 90, there is no need for a seal between the interior 68 of the sleeve 60 and the exterior 62 of the wall 26, because the face seal member 78 prevents any fluid from passing between that interface, as well as the interface between the filter head 22 and the filter arrangement 20.

4. The Embodiment of FIGS. 24-27

In the embodiment of FIGS. 24-27, there is also included a collar 124 and a spring 126. The spring 126 is located between the interior 64 of the housing 24 and the second endcap 44, to help urge the filter media construction 36 in a direction upwardly toward the mouth 30. The function of the collar 124 is described further below.

In this embodiment, the surrounding wall 26 includes a shoulder 128 (FIG. 27) projecting radially outwardly. The first rim 88 of the sleeve 60 engages against the shoulder 128.

The surrounding wall 26 includes a plurality of radial protrusions 130 extending longitudinally from adjacent the open mouth partially along the surrounding wall 26. The interior 68 of the sleeve 60 includes a plurality of reliefs 132. Each relief 132 extends longitudinally from the first rim 88 along the sleeve interior 68, with each relief 132 receiving one of the protrusions 130.

The sleeve 60 includes a second rim 134 at an end opposite of the first rim 88. The sleeve 60 defines a projection 136 extending radially inwardly and spaced adjacent to the second rim 134. The exterior 62 of the surrounding wall 26 defines a groove 138 receiving the projection 136. The snap fit of projection 136 into groove 138 prevents relative axial motion between the sleeve 60 and the housing 24.

The collar 124 includes a radial ring 140. In the embodiment shown, the radial ring 140 is at an end of the collar 124. The collar 124 is operably received within the open mouth 30 of the housing 24 with the radial ring 140 being engaged against the shoulder 128 of the surrounding wall 26. The surrounding wall 26 is then bent radially inwardly to form bend 141 over the radial ring 140 of the collar 124. This locks the sleeve 60, housing 24, and collar 124. The interlocking of the reliefs 132 and protrusions 130 prevent relative radial motion between the sleeve 60 and the housing 24.

A series of tabs 142 extend from the first end cap 42 and are located between the interior 64 of the housing wall 26 and an outer diameter 38. The tabs 142 have an outer diameter that is larger than the inner diameter of the collar 124. Therefore, the collar 124 holds the filter media construction 36 inside of the housing 124 during servicing, since the collar 124 interferes with the tabs 142.

5. The Embodiments of FIGS. 28-31

In the embodiments of FIGS. 28-31, the housing 24 is "insert molded" to the sleeve 60. In this arrangement, the surrounding wall 26 includes flange 90 (FIG. 30) extending radially from the adjacent mouth 30. In this embodiment, the flange 90 defines a plurality of axial through slots 146. The housing 24 is inserted into a mold that is designed to produce sleeve 60 as a molded plastic part. With the housing 24 in the mold, and the mold closed, molten plastic is injected into the mold cavity to form the sleeve 60. A portion of this molten plastic fills in the slots 146 as well as surrounds the entire flange 90 and a portion of the outside upper section 148 of the housing 24. After the molten plastic fully fills the cavity in the mold, it cools until it becomes solid. The result is a single part that is made up of the housing 24 and the sleeve 60 locked together (FIG. 31) at the flange 90 and the slots 146, such that the two parts cannot move either axially or circumferentially relative to each other. The interface between the flange 90 and the sleeve 60 is leak-tight and does not require an additional seal.

6. The Embodiment of FIGS. 32-40

In this embodiment, the surrounding wall 26 includes a plurality of flanges 152 (FIG. 37) extending radially outwardly from adjacent the open mouth 30. The first rim 88 of the sleeve 60 engages against the flanges 152. In this embodiment, the sleeve 60 includes a plurality of ramped tabs 156 extending axially between the flanges 152.

A locking collar 156 is provided. The locking collar 156 defines a plurality of slots 158, and the locking collar 156 is oriented within the surrounding wall 26 with the ramped tabs 154 being received within and snapped over the slots 158 in the locking collar 156. The outside diameter of the tabs 154 is slightly larger than the outside diameter of the slots 158. As the tabs 154 are inserted into the slots 158, the ramps on each of the tabs 154 cause the tabs 154 to deflect radially inwardly, allowing an upper portion of the tabs 154 to completely pass through a respective one of the slots 158. After passing through the slot 158, each tab 154 returns to its original shape. A hook 160 (FIG. 40) on the tabs 154 will catch on a surface 162 (FIG. 38) of the slot 158 in the locking collar 156, preventing the locking collar from separating from the sleeve 60. The flanges 152 are now trapped between the locking collar 156 and the sleeve 60, and all three components cannot move relative to each other axially or circumferentially.

B. Methods

It should be understood that methods of making filter arrangement 20 have been discussed above and can utilize the various arrangements described herein. In general, a method includes providing housing 24 having surrounding wall 26 defining interior volume 28, an open mouth 30 providing access to the interior volume 28 and an end 32 opposite of the open mouth 30. The method includes orienting filter media construction 36 within the interior volume 28. The method further includes orienting sleeve 60 distinct from the housing 60 distinct from the housing, around the exterior wall 26 adjacent to the mouth 30 and extending partially along the surrounding wall 26. The exterior 66 of the sleeve 60 defines mounting threads 70 constructed and arranged to removably mount with the filter head 22, when the filter arrangement is secured to the filter head 22. The interior 68 of the sleeve 60 is against the exterior 66 of the surrounding wall 26. Next, the method includes securing the sleeve 60 to the housing 24, and then providing first seal member 72 against the sleeve 60 to create the seal with the filter head 22.

The step of securing can include crimping tabs on the housing 24 into slots 92 in the sleeve 60. The step of securing can also include bending tabs 82 on the housing 24 into slots 92 in the sleeve 60.

The step of securing can include snuggly aligning a non-round housing 24 having at least one curved segment 118 and at least one straight segment 120 with a same shaped non-round sleeve 60.

The step of securing can include an inward projection 136 on the sleeve 60 onto a groove 138 in the surrounding wall 26; orienting the collar 124 having radial ring 140 within the open mouth 40 of the housing 24 and engaging the radial ring 140 against shoulder 128 of the surrounding wall 26; bending the surrounding wall 26 radially inwardly over the radial ring of the collar 124; and aligning radial protrusions 130 of the surrounding wall 26 with reliefs 132 in the sleeve 60.

The step of securing can include injection molding the sleeve 60 around the housing 24 to provide at least a portion of the sleeve 60 to be molded within slots 146 of flange 90 extending from a portion of the surrounding wall 26 adjacent to the open mouth 30.

The step of securing can include using flanges 152 extending radially outwardly from the open mouth 30, using ramped tabs 154 extending outwardly from the sleeve 60 between the flanges 152, and using locking collar 156 defining slots 158, so that the locking collar 156 is oriented within the surrounding wall 26 with the ramped tabs 154 being received within and snapped over the slots 158 in the locking collar 156.

What is claimed is:

1. A filter arrangement for threadably securing to a filter head, the filter arrangement comprising:
    (a) a housing having a surrounding wall defining an interior volume, an opening providing access to the interior volume, and a closed end; the opening being at an upper portion of the filter arrangement and the closed end being at a bottom portion of the filter arrangement when oriented in a first position;
        the surrounding wall having an exterior and an interior;
        (ii) the surrounding wall having a lip extending radially outward from adjacent the opening;
    (b) a filter media construction operably held within the interior volume;
    (c) a first end cap secured to the filter media construction in the upper portion of the filter arrangement;
        (i) the first end cap having a radial groove;
        (ii) a seal ring positioned in the radial groove of the first end cap;
        (iii) the first end cap including an end cap structure oriented against the interior of the surrounding wall;
    (c) a sleeve, distinct from the housing, secured to the exterior of the surrounding wall adjacent to the housing opening and extending partially along the surrounding wall in the upper portion of the filter arrangement; the sleeve having an exterior and an interior;
        (i) the exterior of the sleeve defining mounting threads constructed and arranged to removably mount with the filter head, when the filter arrangement is secured to the filter head;
        (ii) the interior of the sleeve being against the exterior of the surrounding wall;
        (iii) the sleeve interior having a first section with a first diameter and a second section with a second diameter; the second diameter being larger than the first diameter to form a shoulder therebetween;
            (A) an upper end of the first end cap being above the shoulder, when the filter arrangement is oriented in the first position with the housing opening being at the upper portion and the housing closed end being at the bottom portion;
            (B) the shoulder being positioned relative to the mounting threads such that at least one mounting thread is above the shoulder and at least one mounting thread is below the shoulder, when the filter arrangement is oriented in the first position;
        (iv) the housing lip being retained by the sleeve to trap the housing in place; and
    (d) an outward radially extending seal member oriented outside of the housing interior and above the mounting threads to create a seal with a filter head, when the filter arrangement is secured to the filter head; and
        (i) wherein the outward radially extending seal member is the only seal member oriented outside of the housing interior.

2. The filter arrangement of claim 1 wherein the sleeve is a molded part.

3. The filter arrangement of claim 1 wherein the sleeve is an injection-molded part.

4. The filter arrangement of claim 1 wherein the filter media construction includes pleated media arranged in a cylindrical form to define an open filter interior.

5. The filter arrangement of claim 1 wherein the outward radially extending seal member is located radially inward of an outermost diameter of the mounting threads.

6. The filter arrangement of claim 1 wherein the housing lip is embedded in the sleeve with portions of the sleeve surrounding the lip.

7. The filter arrangement of claim 6 wherein the housing lip defines a plurality of axial through-slots; and portions of the sleeve penetrate the through-slots.

8. The filter arrangement of claim 1 wherein the exterior of the sleeve defines a radial groove holding the outward radially extending seal member.

9. The filter arrangement of claim 1 wherein the upper end of the first end cap is within the interior volume of the housing.

10. The filter arrangement of claim 1 wherein the upper end of the first end cap is below the opening of the housing.

11. A filter arrangement for threadably securing to a filter head, the filter arrangement comprising:
    (a) a housing having a surrounding wall defining an interior volume, an opening providing access to the interior volume, and a closed end; the opening being at an upper portion of the filter arrangement and the closed end being at a bottom portion of the filter arrangement when oriented in a first position;
        (i) the surrounding wall having an exterior and an interior;
        (ii) the surrounding wall having a lip portion extending radially outward from adjacent the opening;
    (b) a filter media construction operably held within the interior volume;
    (c) a first end cap secured to the filter media construction in the upper portion of the filter arrangement;
        (i) the first end cap having a radial groove;
        (ii) a seal ring positioned in the radial groove of the first end cap;
    (d) a separate sleeve distinct from the housing secured to the exterior of the surrounding wall adjacent to the housing opening and extending partially along the surrounding wall; the sleeve having an upper end, an exterior, and an interior;
        (i) the interior of the sleeve being against the exterior of the surrounding wall;
        (ii) the housing lip portion extending over the upper end of the sleeve;
        (iii) the interior of the sleeve defining a seal gland holding a seal gland member forming a radial seal between and against the sleeve and the exterior of the surrounding wall;
    (c) a first seal member oriented outside of the surrounding wall to create a seal with a filter head, when the filter arrangement is secured to the filter head; and (d) mounting threads outside of the surrounding wall constructed and arranged to removably mount with the filter head, when the filter arrangement is secured to the filter head.

12. The filter arrangement of claim 11 wherein the sleeve is a molded part.

13. The filter arrangement of claim 11 wherein the filter media construction includes pleated media arranged in a cylindrical form to define an open filter interior.

14. The filter arrangement of claim 11 wherein the lip portion includes a plurality of tabs extending radially outwardly from the surrounding wall at the opening.

15. The filter arrangement of claim 11 wherein the upper end of the sleeve comprises a rim adjacent the opening.

16. The filter arrangement of claim 14 wherein:
    (a) the upper end of the sleeve comprises a rim defining a plurality of slots, each slot in the plurality of slots receiving one of the tabs; and
    (b) the sleeve is secured to the housing by the tabs being formed over the slots.

17. A filter arrangement according to claim 16 wherein the tabs are in a folded position relative to the slots.

18. The filter arrangement of claim 11 wherein the exterior of the sleeve defines a radial groove holding the first seal member.

19. The filter arrangement of claim 11 wherein the upper end of the first end cap is within the interior volume of the housing.

20. The filter arrangement of claim 11 wherein the upper end of the first end cap is below the opening of the housing.

* * * * *